US012374813B2

(12) United States Patent
Hsu et al.

(10) Patent No.: US 12,374,813 B2
(45) Date of Patent: Jul. 29, 2025

(54) ELECTRICAL CONNECTOR WITH THICKNESS ADJUSTMENT MEMBER AND METHOD OF MAKING THE SAME

(71) Applicant: Luxshare Precision Industry Company Limited, Shenzhen (CN)

(72) Inventors: Chien-Yu Hsu, Shenzhen (CN); Ruey-Ting Liao, Shenzhen (CN); Shih-Tung Lin, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 402 days.

(21) Appl. No.: 18/106,336

(22) Filed: Feb. 6, 2023

(65) Prior Publication Data

US 2023/0402777 A1 Dec. 14, 2023

(30) Foreign Application Priority Data

Jun. 14, 2022 (CN) ......................... 202210664695.8

(51) Int. Cl.

*H01R 12/00* (2006.01)
*H01R 12/71* (2011.01)
*H01R 12/91* (2011.01)
*H01R 13/504* (2006.01)
*H01R 43/18* (2006.01)

(52) U.S. Cl.

CPC ........... *H01R 12/712* (2013.01); *H01R 12/91* (2013.01)

(58) Field of Classification Search

CPC .... H01R 12/712; H01R 12/91; H01R 13/504; H01R 13/6658; H01R 2107/00; H01R 24/60; H01R 43/18

See application file for complete search history.

(56) References Cited

U.S. PATENT DOCUMENTS 9,300,095 B2 * 3/2016 Lin .................... H01R 13/6585
9,847,604 B2 * 12/2017 Guo ..................... H01R 13/405
10,063,014 B2 * 8/2018 Wen ....................... H01R 24/60

(Continued)

FOREIGN PATENT DOCUMENTS

CN 204088689 U 1/2015
CN 204835065 U 12/2015

(Continued)

*Primary Examiner* — Abdullah A Riyami
*Assistant Examiner* — Thang H Nguyen
(74) *Attorney, Agent, or Firm* — Birch, Stewart, Kolasch & Birch, LLP

(57) ABSTRACT

An electrical connector includes a built-in circuit board, an insulating member and a shielding shell. The built-in circuit board includes an extension portion. The insulating member is fixed to the built-in circuit board. The insulating member includes an attachment portion. The shielding shell is provided with a mating space. The electrical connector includes a tongue plate extending into the mating space. The tongue plate includes at least the extension portion and the attachment portion. A thickness of the tongue plate includes at least a thickness of the extension portion and a thickness of the attachment portion. By adjusting the thickness of the attachment portion, the tongue plate with a target thickness can be obtained, thereby reducing the requirement on the built-in circuit board. A method of making the electrical connector is also disclosed.

20 Claims, 23 Drawing Sheets

(56) References Cited

U.S. PATENT DOCUMENTS

| | | | | |
|---|---|---|---|---|
| 10,193,271 | B2 * | 1/2019 | Yu | H01R 12/58 |
| 10,559,926 | B2 * | 2/2020 | Chen | H01R 12/735 |
| 11,303,077 | B2 * | 4/2022 | Mao | H01R 13/6585 |
| 2016/0126677 | A1 * | 5/2016 | Yu | H01R 13/6474<br>439/607.23 |
| 2019/0052020 | A1 * | 2/2019 | Chen | H01R 13/504 |
| 2019/0363495 | A1 * | 11/2019 | Ju | H01R 13/6594 |
| 2023/0122513 | A1 * | 4/2023 | Wang | H01R 13/6471<br>439/607.05 |
| 2023/0261425 | A1 * | 8/2023 | Sun | H01R 43/20<br>439/607.05 |

FOREIGN PATENT DOCUMENTS

| | | | |
|---|---|---|---|
| CN | 106025630 | A | 10/2016 |
| CN | 206628623 | U | 11/2017 |
| CN | 106450909 | B | 1/2019 |
| JP | 4-249082 | A | 9/1992 |
| TW | 1740044 | B | 9/2021 |

* cited by examiner

ELECTRICAL CONNECTOR WITH THICKNESS ADJUSTMENT MEMBER AND METHOD OF MAKING THE SAME

CROSS-REFERENCE TO RELATED APPLICATION

This patent application claims priority of a Chinese Patent Application No. 202210664695.8, filed on Jun. 14, 2022 and titled "ELECTRICAL CONNECTOR AND METHOD OF MAKING THE SAME", the entire content of which is incorporated herein by reference.

TECHNICAL FIELD

The present disclosure relates to an electrical connector and a method of making the same, which belongs to a technical field of connectors.

BACKGROUND

With the continuous development of electrical connectors, there are more and more solutions that use built-in circuit boards as tongue plate to mate with mating connectors. The built-in circuit board is usually a printed circuit board (PCB), which is not beneficial to tight dimensional control due to the large manufacturing tolerances of the built-in circuit board. If the thickness of the built-in circuit board is too thick, when the tongue plate is inserted into the mating connector, contact terminals of the mating connector will be excessively crimped, which will cause permanent deformation of the contact terminals. If the thickness of the built-in circuit board is too thin, when the tongue plate is inserted into the mating connector, the contact force between the gold fingers on the tongue plate and the contact terminals of the mating connector is insufficient, which is likely to cause poor contact. In addition, different types of electrical connectors have different requirements on the thickness of the tongue plate. If the built-in circuit board is completely used as the tongue plate, the models and types of the built-in circuit board will be greatly increased, resulting in higher cost.

SUMMARY

An object of the present disclosure is to provide an electrical connector with lower cost and higher manufacturing flexibility, and a method of making the same.

In order to achieve the above object, the present disclosure adopts the following technical solution: an electrical connector, including: a built-in circuit board including an extension portion, the extension portion including a first mating surface and a second mating surface opposite to the first mating surface, the built-in circuit board including a plurality of mating conductive elements disposed on the first mating surface or the second mating surface, the extension portion having a thickness defined by a distance between the first mating surface and the second mating surface; and a thickness adjustment member fixed with the built-in circuit board, the thickness adjustment member including a reference surface, the first mating surface, the second mating surface and the reference surface being located in different planes, a distance between the reference surface and the first mating surface being defined as a set thickness of the extension portion; wherein the electrical connector is configured to make the set thickness reach a target thickness by controlling a position of the reference surface relative to the extension portion, and the target thickness is greater than the thickness of the extension portion.

In order to achieve the above object, the present disclosure adopts the following technical solution: an electrical connector, including: a built-in circuit board including an extension portion, the extension portion including a first surface and a second surface opposite the first surface, the built-in circuit board including a plurality of mating conductive elements provided on the first surface, the extension portion having a thickness defined by a distance between the first surface and the second surface; an insulating member fixed to the built-in circuit board, the insulating member including an attachment portion, the attachment portion including a third surface abutting against the second surface of the built-in circuit board and a fourth surface opposite to the third surface, the attachment portion having a thickness defined by a distance between the third surface and the fourth surface; and a shielding shell provided with a mating space, the extension portion and the attachment portion being at least partially located in the mating space; wherein the electrical connector includes a tongue plate, the tongue plate includes at least the extension portion and the attachment portion, and a thickness of the tongue plate includes at least the thickness of the extension portion and the thickness of the attachment portion.

In order to achieve the above object, the present disclosure adopts the following technical solution: a method of manufacturing an electrical connector, the electrical connector including: a built-in circuit board including an extension portion, the extension portion including a first surface and a second surface opposite the first surface, the built-in circuit board including a plurality of mating conductive elements provided on the first surface, the extension portion having a thickness defined by a distance between the first surface and the second surface; an insulating member fixed to the built-in circuit board, the insulating member including an attachment portion, the attachment portion including a third surface abutting against the second surface of the built-in circuit board and a fourth surface opposite to the third surface, the attachment portion having a thickness defined by a distance between the third surface and the fourth surface; and a shielding shell provided with a mating space, the extension portion and the attachment portion being at least partially located in the mating space; wherein the electrical connector includes a tongue plate, the tongue plate includes at least the extension portion and the attachment portion, and a thickness of the tongue plate includes at least the thickness of the extension portion and the thickness of the attachment portion; the method including following steps: S1, providing the built-in circuit board, the thickness of the extension portion of the built-in circuit board being smaller than the target thickness; S2, providing the thickness adjustment member, the thickness adjustment member being injection-molded with the built-in circuit board, the thickness of the attachment portion of the insulating member being smaller than the target thickness, at least the extension portion of the built-in circuit board and the attachment portion of the insulating member forming the tongue plate of the electrical connector, the thickness of the tongue plate including at least the thickness of the extension portion and the thickness of the attachment portion, and the thickness of the tongue plate reaching the target thickness; and S3, providing the shielding shell assembled to and fixed with the insulating member.

Compared with the prior art, the present disclosure provides a thickness adjustment member, and the thickness adjustment member includes a reference surface. By controlling the position of the reference surface relative to the extension portion, the set thickness can reach the target thickness, thereby reducing the requirement for the built-in circuit board, reducing the cost, and improving the flexibility of manufacturing. In addition, the present disclosure uses the extension portion of the built-in circuit board as a part of the tongue plate, and also uses the attachment portion of the insulating member as a part of the tongue plate. By adjusting the thickness of the attachment portion, the tongue plate with the target thickness can be obtained, thereby reducing the requirement for the built-in circuit board, reducing the cost, and improving the flexibility of manufacture.

DETAILED DESCRIPTION

Figure 1:
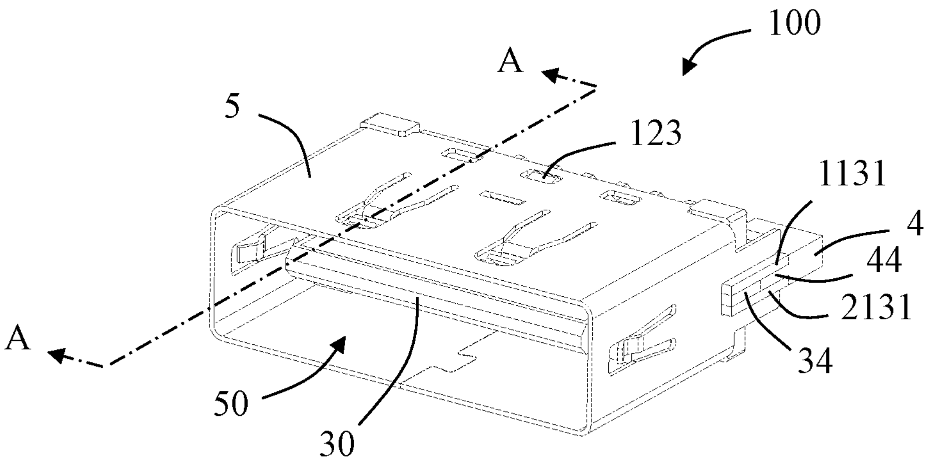
FIG. 1 is a perspective schematic view of an electrical connector in accordance with a first embodiment of the present disclosure.
Figure 2:
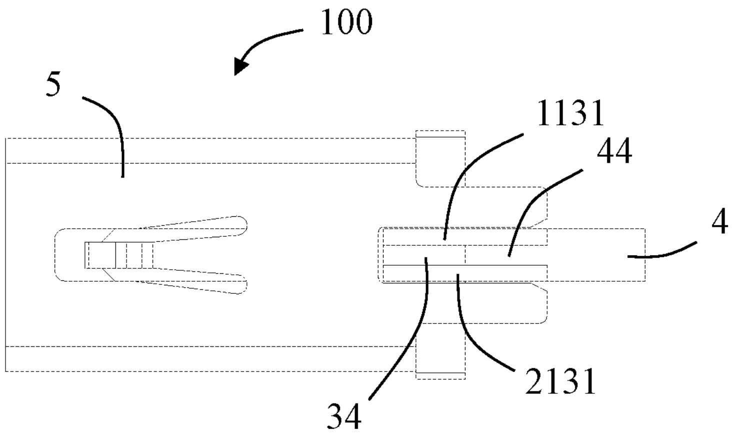
FIG. 2 is a right side view of FIG. 1.
Figure 3:
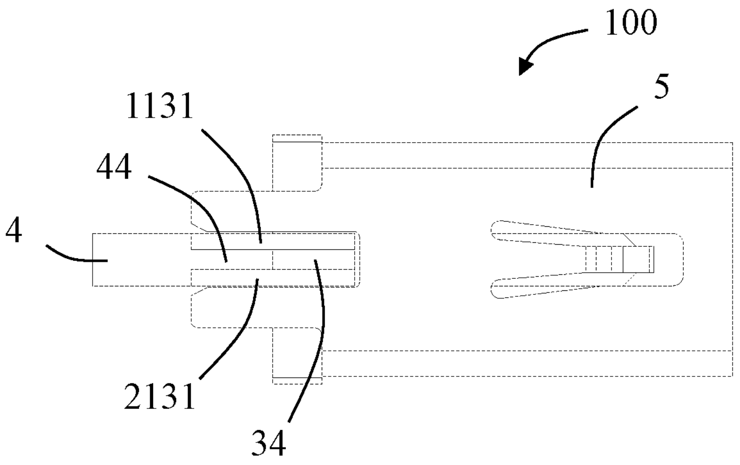
FIG. 3 is a left side view of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 14, a first embodiment illustrated in the present disclosure discloses an electrical connector 100 including a first circuit board assembly 10, a second circuit board assembly 20, an insulating member 3, a support block 4 and shielding shell 5. In the first embodiment of the present disclosure, the first circuit board assembly 10 and the second circuit board assembly 20 are assembled together. The insulating member 3 is injection-molded with the first circuit board assembly 10 and the second circuit board assembly 20. The shielding shell 5 is made of metal material and is assembled to and fixed with the insulating member 3.

Referring to FIGS. 6 to 13, the first circuit board assembly 10 includes the first built-in circuit board 11 and a first insulating block 12 fixed to the first built-in circuit board 11. In an embodiment of the present disclosure, the first insulating block 12 is injection-molded with the first built-in circuit board 11 so as to be integrated with the first built-in circuit board 11 as a whole.

The first built-in circuit board 11 includes a first main body portion 111, a first extension portion 112 extending forwardly from the first main body portion 111, and a first rear end portion 113 extending backwardly from the first main body portion 111. In the illustrated embodiment of the present disclosure, the first main body portion 111 is at least partially embedded in the first insulating block 12. The first main body portion 111 defines a plurality of first through holes 1111 extending through the first main body portion 111 in a top-bottom direction. When the first insulating block 12 is injection molded, the first insulating block 12 passes through the plurality of first through holes 1111, thereby facilitating molding of the first insulating block 12 and improving the bonding strength of the first insulating block 12 and the first built-in circuit board 11. That is, by enhancing the flow and filling properties of the plastic, the occurrence of unsaturated molds is reduced. The first extension portion 112 includes a first surface 1121 (e.g., an upper surface) and a second surface 1122 (e.g., a lower surface) opposite to the first surface 1121. The first built-in circuit board 11 further includes a plurality of first mating conductive pads 1121*a* disposed on the first surface 1121. Each of the first mating conductive pads 1121*a* is in the shape of a flat plate. Of course, in other embodiments, the plurality of first mating conductive pads 1121*a* may also be disposed on the second surface 1122. The first extension portion 112 has a thickness T1 defined by a distance between the first surface 1121 and the second surface 1122. A width of the first rear end portion 113 along a left-right direction is larger than a width of the first main body portion 111 along the left-right direction. The first rear end portion 113 includes first protruding portions 1131 respectively protruding from the first main body portion 111 to both sides. In addition, the first built-in circuit board 11 is further provided with a first holding hole 114 extending through the first built-in circuit board 11 in the top-bottom direction. In the embodiment shown in the present disclosure, the first holding hole 114 is provided on the first protruding portion 1131. Of course, it is understandable to those skilled in the art that the first holding hole 114 may also be provided on the first main body portion 111 or other positions of the first rear end portion 113.

The first insulating block 12 includes a first abutting surface 121 (e.g., a lower surface) and a positioning post 122 formed through the first holding hole 114. The positioning post 122 protrudes downwardly beyond the first abutting surface 121 to mate with the second circuit board assembly 20. A middle portion of the first insulating block 12 is further provided with a first locking protrusion 123 protruding upwardly.

The second circuit board assembly 20 includes the second built-in circuit board 21 and a second insulating block 22 fixed with the second built-in circuit board 21. In an embodiment of the present disclosure, the second insulating block 22 is injection-molded with the second built-in circuit board 21 so as to be integrated with the second built-in circuit board 21 as a whole.

The second built-in circuit board 21 includes a second main body portion 211, a second extension portion 212 extending forwardly from the second body portion 211, and a second rear end portion 213 extending backwardly from the second main body portion 211. In the embodiment shown in the present disclosure, the second body portion 211 is at least partially embedded in the second insulating block 22. The second main body portion 211 defines a plurality of second through holes 2111 extending through the second main body portion 211 in the top-bottom direction. When the second insulating block 22 is injection molded, the second insulating block 22 passes through the plurality of second through holes 2111, thereby facilitating molding of the second insulating block 22 and improving the bonding strength of the second insulating block 22 and the second built-in circuit board 21. That is, by enhancing the flow and filling properties of the plastic, the occurrence of unsaturated molds is reduced. The second extension portion 212 includes a fifth surface 2121 (e.g., an upper surface) and a sixth surface 2122 (e.g., a lower surface) opposite to the fifth surface 2121. The second built-in circuit board 21 further includes a plurality of second mating conductive pads 2122*a* disposed on the sixth surface 2122. Each of the second mating conductive pads 2122*a* is in the shape of a flat plate. Of course, in other embodiments, the plurality of second mating conductive pads 2122*a* may also be disposed on the fifth surface 2121. The second extension portion 212 has a thickness T2 defined by a distance between the fifth surface 2121 and the sixth surface 2122. A width of the second rear end portion 213 along the left-right direction is larger than a width of the second main body portion 211 along the left-right direction. The second rear end portion 213 includes second protruding portions 2131 respectively protruding from the second main body portion 211 to both sides. In addition, the second built-in circuit board 21 is further provided with a second holding hole 214 extending through the second built-in circuit board 21 along the top-bottom direction. In the embodiment shown in the present disclosure, the second holding hole 214 is provided on the second protruding portion 2131. Of course, it is understandable to those skilled in the art that the second holding hole 214 may also be provided on the second main body portion 211 or other positions of the second rear end portion 213.

The second insulating block 22 includes a second abutting surface 221 (e.g., an upper surface) and a positioning hole 222 extending upwardly through the second abutting surface 221 and aligned with the second holding hole 214.

Figure 8:
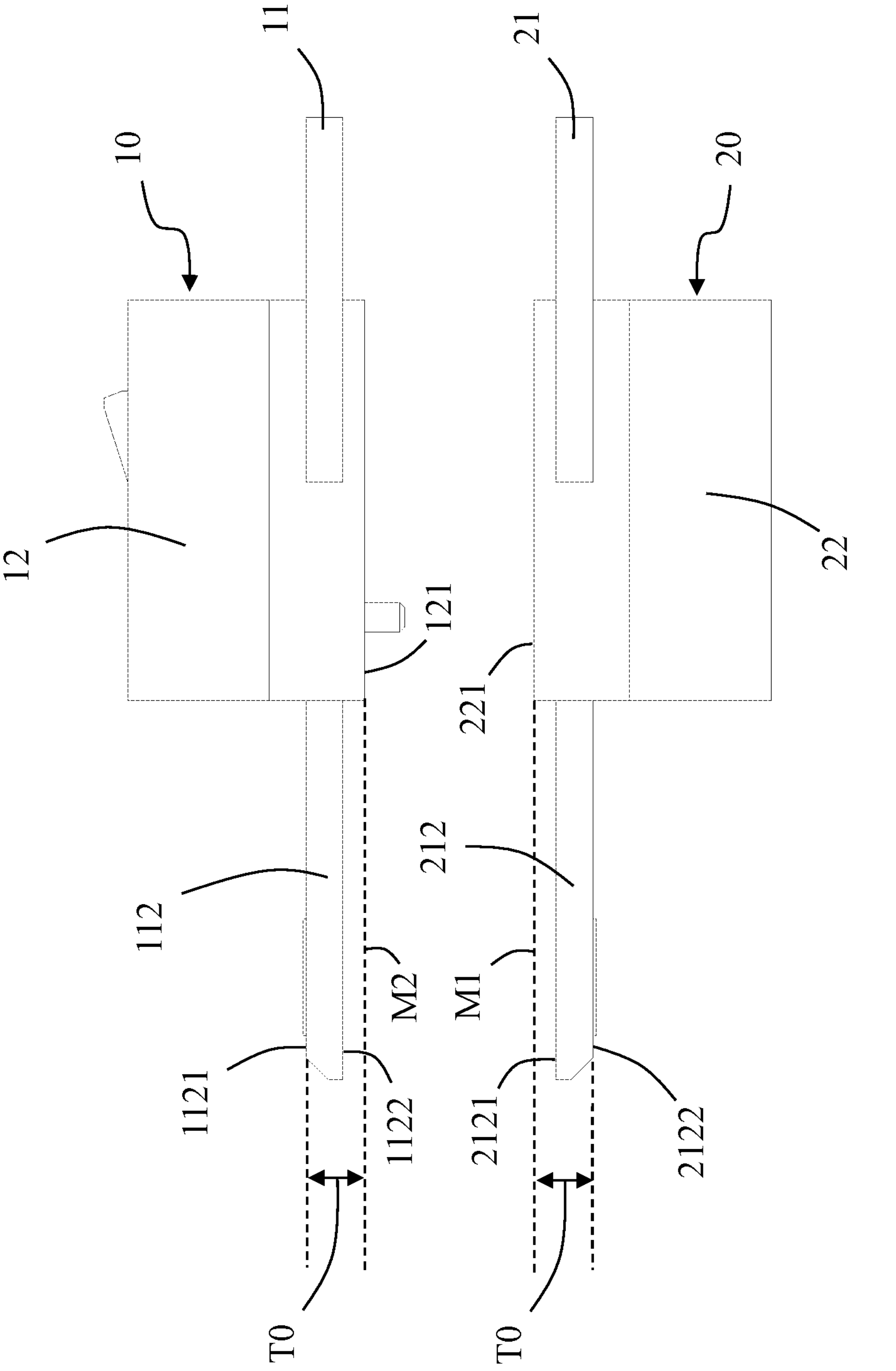
FIG. 8 is an exploded schematic view of the first circuit board assembly and the second circuit board assembly in FIG. 7.
Figure 9:
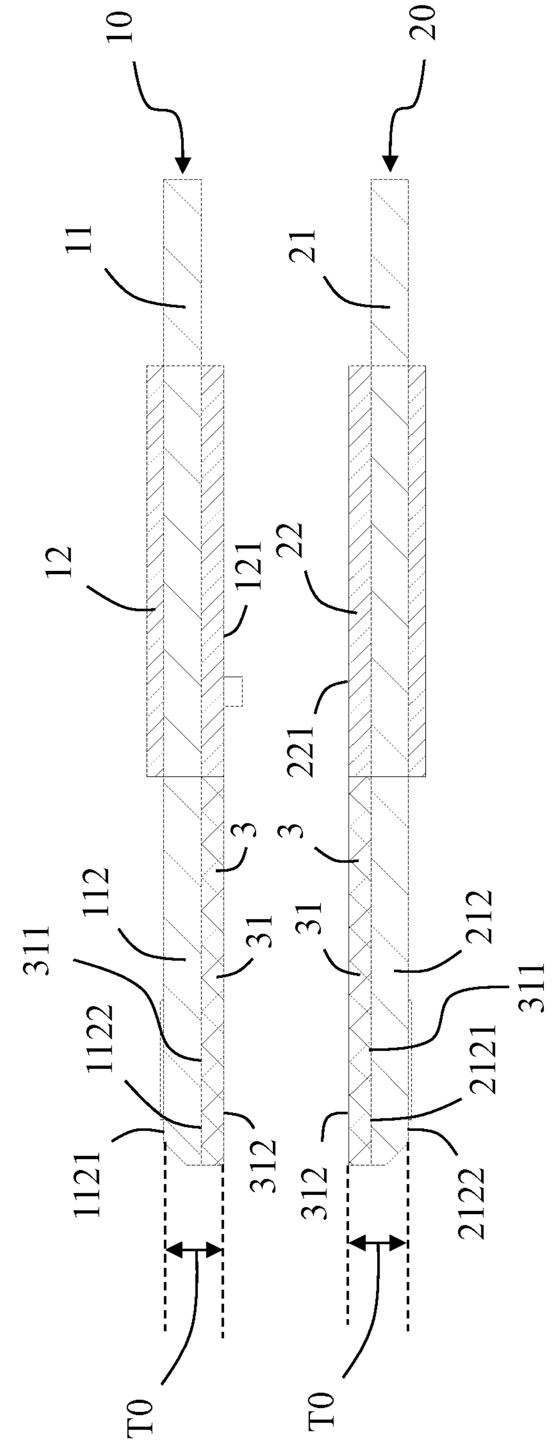
FIG. 9 is a schematic cross-sectional view of FIG. 8 in accordance with another embodiment of the present disclosure.
Figure 10:
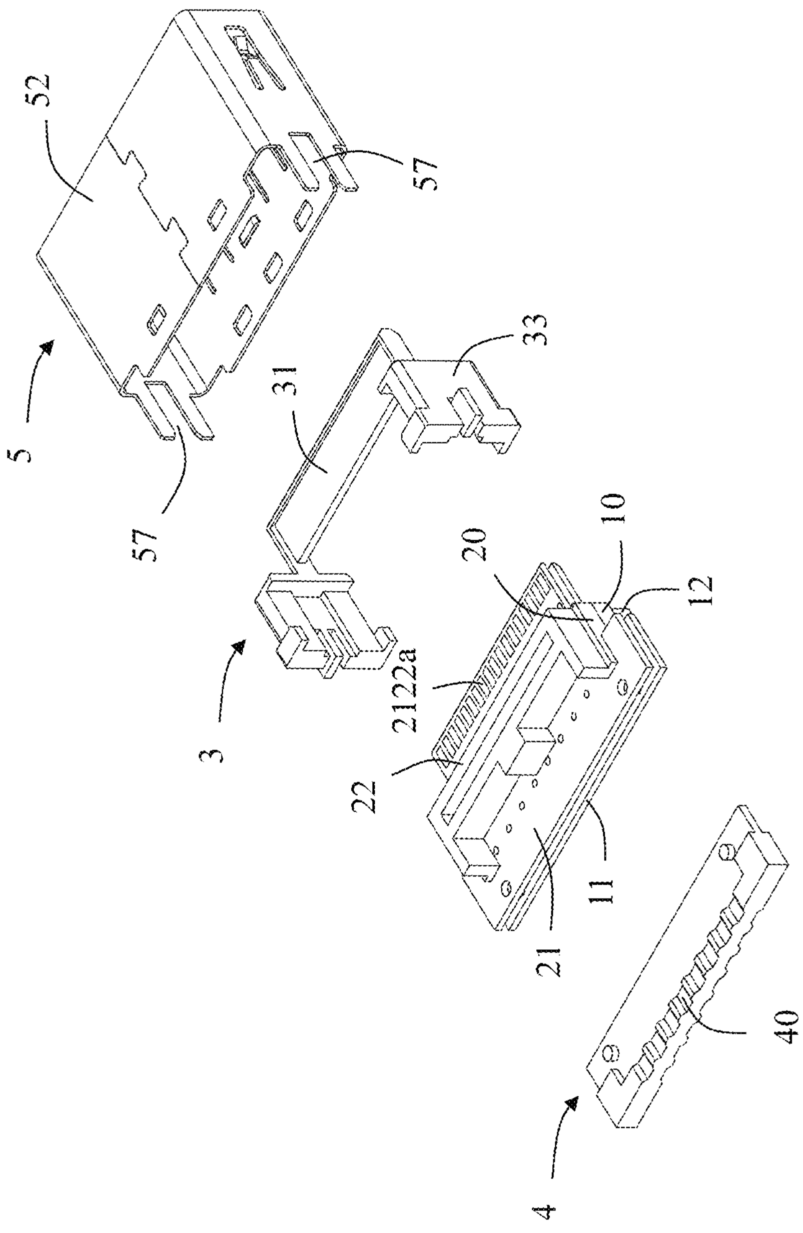
FIG. 10 is a partial perspective exploded view of another angle of FIG. 5.
Figure 11:
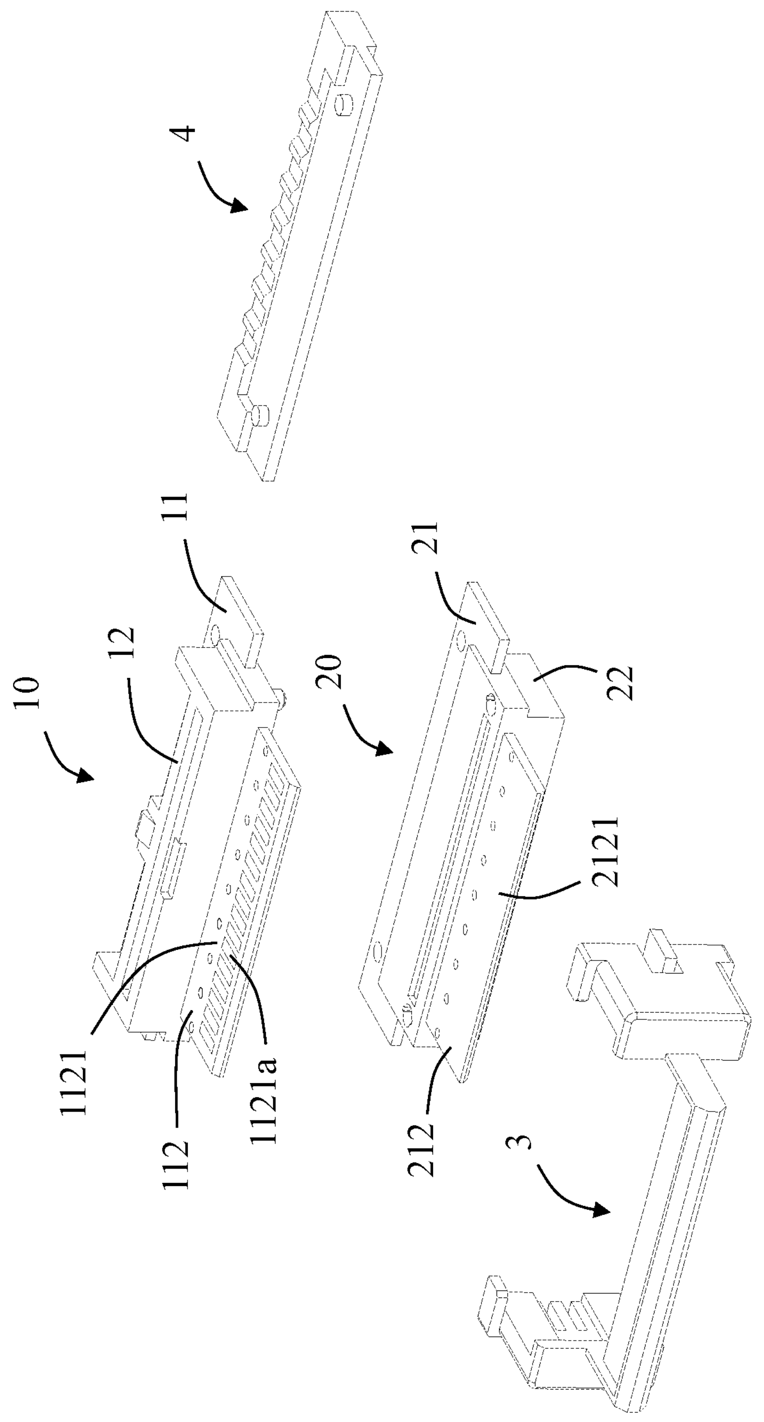
FIG. 11 is a partial perspective exploded view after removing a shielding shell in FIG.
Figure 12:
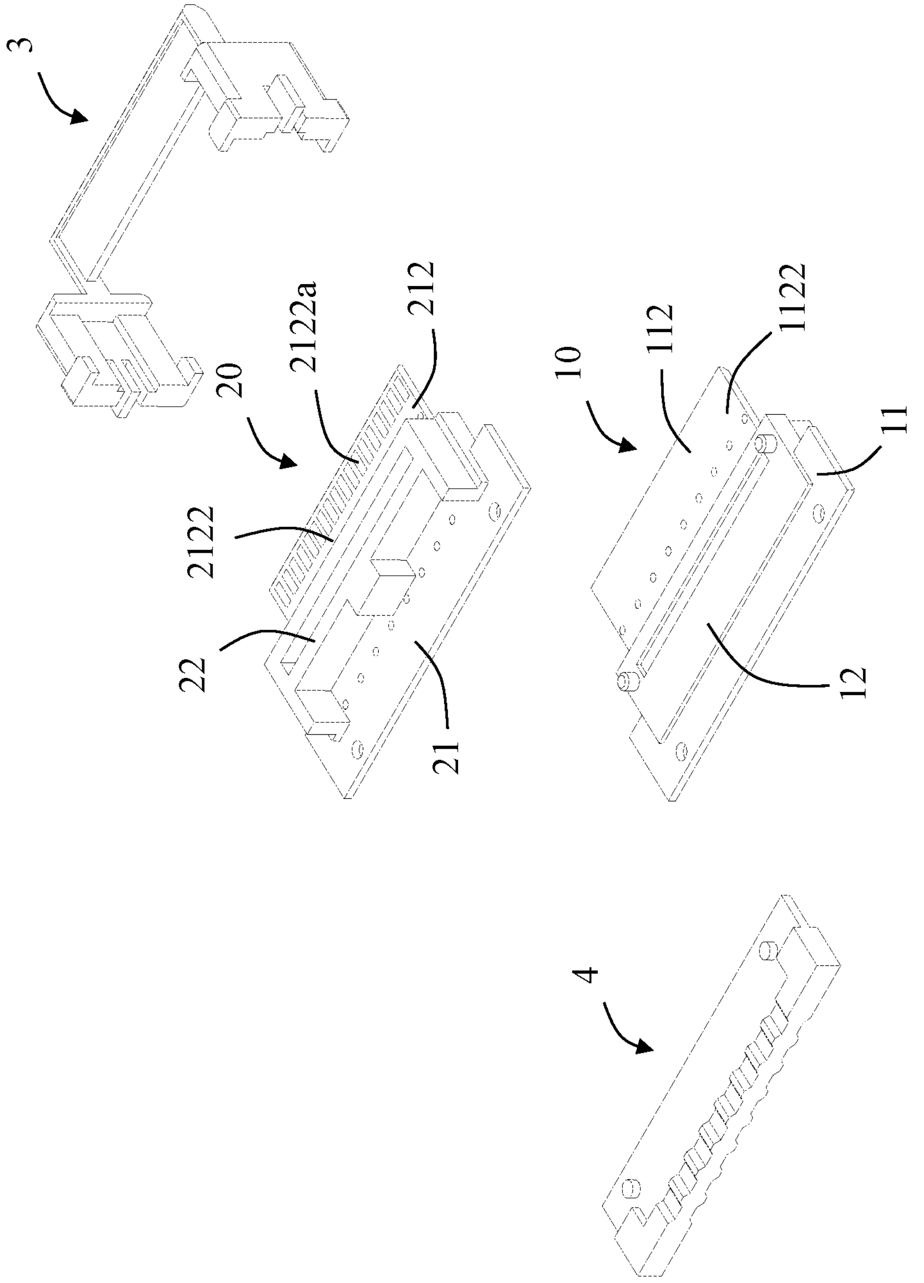
FIG. 12 is a partially exploded perspective view of FIG. 11 from another angle.
Figure 13:
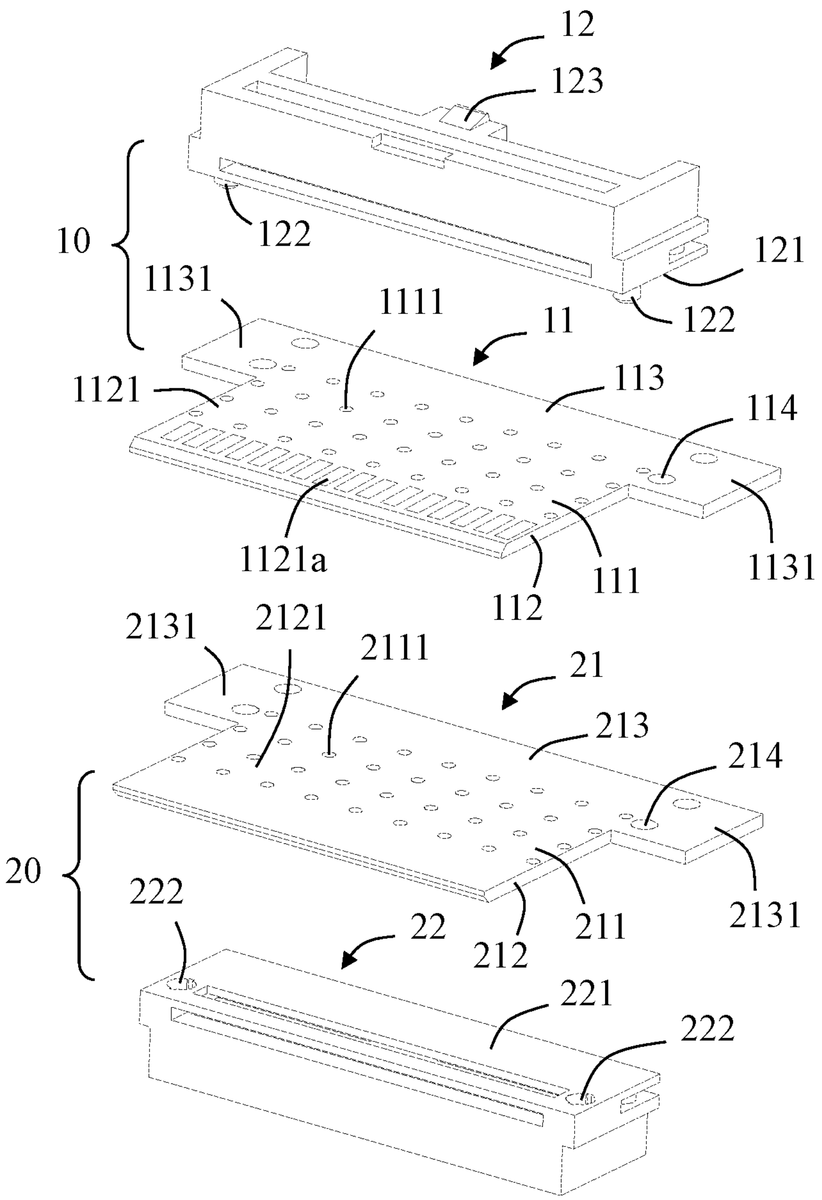
FIG. 13 is an exploded perspective view of the first circuit board assembly and the second circuit board assembly of FIG. 11.

In the embodiments shown in the present disclosure, the first extension portion 112 and the second extension portion 212 are conceptualized as an extension portion, that is, the extension portion includes the first extension portion 112 and/or the second extension portion 212. The extension portion includes a first mating surface and a second mating surface opposite to the first mating surface. The extension portion has a thickness defined by a distance between the first mating surface and the second mating surface. Referring to FIGS. 8 and 9, taking the first circuit board assembly 10 as an example, when the extension portion is the first extension portion 112, the first mating surface is the first surface 1121, and the second mating surface is the second surface 1122. Similarly, taking the second circuit board assembly 20 as an example, when the extension portion is the second extension portion 212, the first mating surface is the sixth surface 2122 and the second mating surface is the fifth surface 2121.

Referring to FIGS. 5 to 13, in an embodiment of the present disclosure, after the first circuit board assembly 10 and the second circuit board assembly 20 are assembled, the positioning post 122 of the first insulating block 12 is inserted into the positioning hole 222 of the second insulating block 22. The first abutting surface 121 of the first insulating block 12 is in contact with the second abutting surface 221 of the second insulating block 22 so as to control the distance between the first extension portion 112 and the second extension portion 212 in the top-bottom direction. The electrical connector 100 includes a filling groove 110 located between the first extension portion 112 and the second extension portion 212 in the top-bottom direction.

Figure 14:
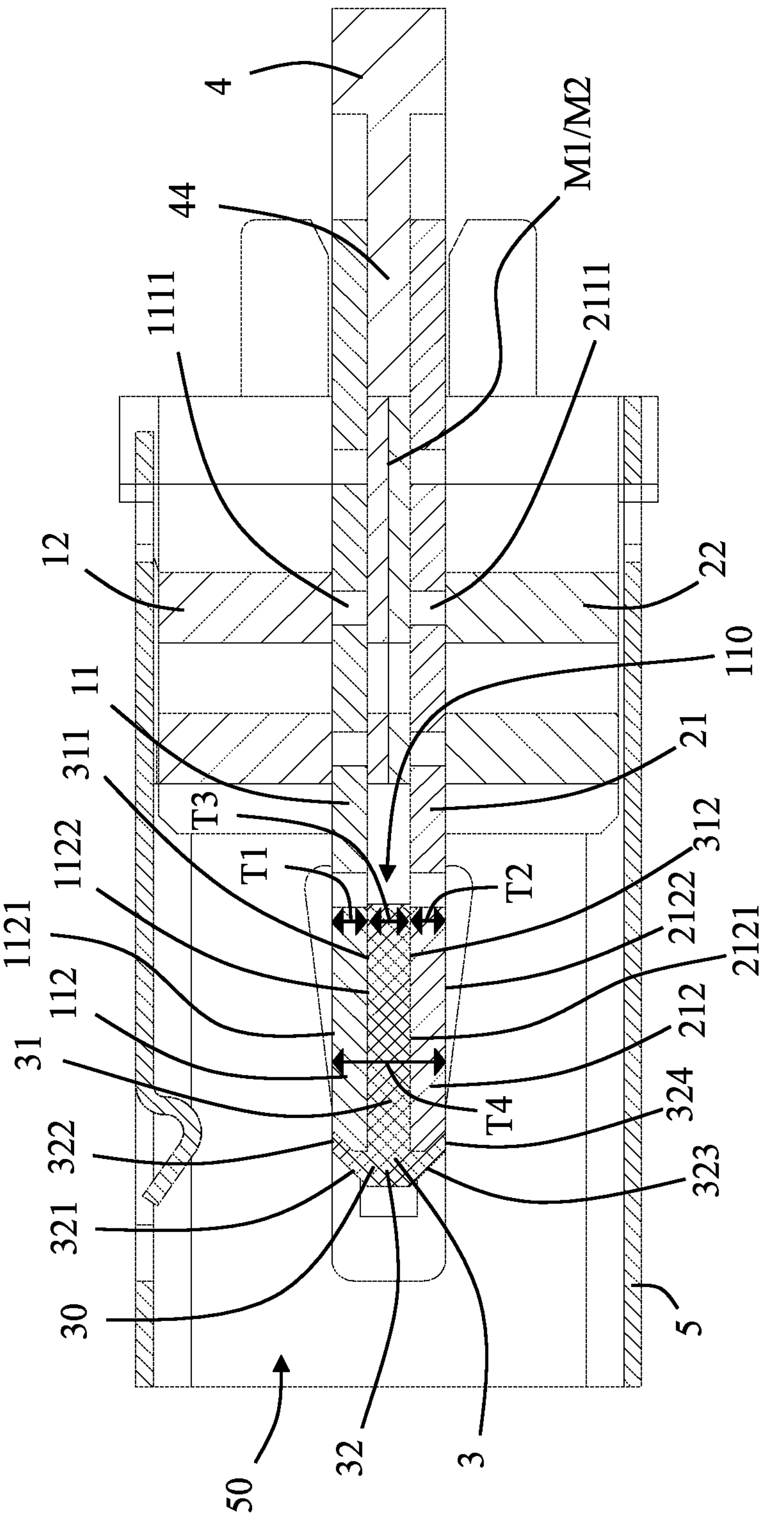
FIG. 14 is a schematic cross-sectional view taken along line A-A in FIG. 1.

Referring to FIG. 14, in an embodiment of the present disclosure, the insulating member 3 is an injection-molded part at least injection-molded into the filling groove 110. Specifically, the insulating member 3 includes an attachment portion 31 filled in the filling groove 110, a head 32 extending forwardly from the attachment portion 31, and a base portion 33 injection-molded with the first insulating block 12 and the second insulating block 22. The attachment portion 31 includes a third surface 311 (e.g., an upper surface) abutting against the second surface 1122 of the first extension portion 112, and a fourth surface 312 (e.g., a lower surface) opposite to the third surface 311. The fifth surface 2121 of the second extension portion 212 abuts against the fourth surface 312 of the attachment portion 31. The attachment portion 31 has a thickness T3 defined by a distance between the third surface 311 and the fourth surface 312. In the illustrated embodiment of the present disclosure, the attachment portion 31 refers to an element that is attached to a surface of the first extension portion 112 and/or the second extension portion 212 for the purpose of increasing the thickness. The attachment portion 31 may or may not be fixed with the first extension portion 112 and/or the second extension portion 212. Preferably, the attachment portion 31 is fixed to the first extension portion 112 and/or the second extension portion 212 (e.g., by means of injection molding).

Referring to FIG. 14, in the embodiment shown in the present disclosure, the head 32 is located at a front end of the first extension portion 112 and at a front end of the second extension portion 212 in order to protect the first extension portion 112 and the second extension portion 212. Specifically, the head 32 includes a first inclined guide surface 321, a first outer surface 322 connected to the first inclined guide surface 321, a second inclined guide surface 323, and a second outer surface 324 connected with the second inclined guide surface 323. The first inclined guide surface 321 and the second inclined guide surface 323 make the head 32 taper in a rear-to-front direction, so as to facilitate guiding the head 32 to be inserted into a mating slot (not shown) of the mating connector. The first outer surface 322 is an upper surface of the head 32. The first outer surface 322 is flush with the first surface 1121 of the first extension portion 112. The second outer surface 324 is a lower surface of the head 32. The second outer surface 324 is flush with the sixth surface 2122 of the second extension portion 212.

The electrical connector 100 includes a tongue plate 30. Referring to FIG. 14, in an embodiment of the present disclosure, the tongue plate 30 includes the first extension portion 112, the attachment portion 31 and the second extension portion 212. A thickness T4 of the tongue plate 30 in the top-bottom direction includes the thickness T1 of the first extension portion 112, a thickness T3 of the attachment portion 31 and the thickness T2 of the second extension portion 212. In other words, in this embodiment, the thickness T4 of the tongue plate 30 in the top-bottom direction is equal to a sum of the thickness T1 of the first extension portion 112, the thickness T3 of the attachment portion 31 and the thickness T2 of the second extension portion 212. It is understandable to those skilled in the art that, in the embodiments shown in the present disclosure, a thickness direction of the tongue plate 30 is the top-bottom direction.

In the embodiment shown in the present disclosure, an upper concept of the first insulating block 12 and the second insulating block 22 is the insulating block. An upper concept of the insulating block and the insulating member 3 is the thickness adjustment member. The thickness adjustment member includes a reference surface. The first mating surface, the second mating surface and the reference surface are located in different planes. In the embodiments shown in the present disclosure, the first mating surface, the second mating surface, and the reference surface are arranged in parallel along the top-bottom direction. A distance between the reference surface and the first mating surface is defined as a set thickness T0 of the extension portion.

In different designs, the reference surface may also be different. In an embodiment of the present disclosure, the reference surface is an upper injection molding surface M1 or a lower injection molding surface M2 provided on the insulating block. The upper injection molding surface M1 is an injection molding surface located at a top position of the insulating block. The lower injection molding surface M2 is an injection molding surface located at a bottom of the insulating block. Specifically, referring to FIGS. 8 and 9, in the embodiment shown in the present disclosure, the lower injection molding surface M2 is the first abutting surface 121. The upper injection molding surface M1 is the second abutting surface 221. The electrical connector 100 is configured to make the set thickness T0 reach a target thickness by controlling the position of the reference surface relative to the extension portion. The target thickness is greater than the thickness of the extension portion. In other words, in an embodiment of the present disclosure, by controlling the position of the first abutting surface 121 and/or the second abutting surface 221 relative to the extension portion, the set thickness T0 can reach the target thickness. Preferably, when the first abutting surface 121 and/or the second abutting surface 221 is a plane formed by injection molding, since the injection molding process itself can achieve precise control of the size, this design is more beneficial to control the set thickness T0 so as to achieve the target thickness. In the embodiment shown in FIG. 14 of the present disclosure, it is understandable to those skilled in the art that the lower injection molding surface M2 of the first insulating block 12 and the upper injection molding surface M1 of the second insulating block 22 are attached to each other to form the reference surface.

In another embodiment of the present disclosure, taking the first circuit board assembly as an example, the first mating surface is the first surface 1121, the second mating surface is the second surface 1122, and the reference surface is the fourth surface 312. Or, taking the second circuit board assembly 20 as an example, the first mating surface is the sixth surface 2122, the second mating surface is the fifth surface 2121, and the reference surface is the third surface 311. The electrical connector 100 is configured to make the set thickness T0 reach the target thickness by controlling the position of the reference surface relative to the extension portion. The target thickness is greater than the thickness of the extension portion. Preferably, when the third surface 311 and/or the fourth surface 312 is a plane formed by injection molding, since the injection molding process itself can achieve precise control of the size, this design is more beneficial to control the set thickness T0 so as to achieve the target thickness.

Figure 15:
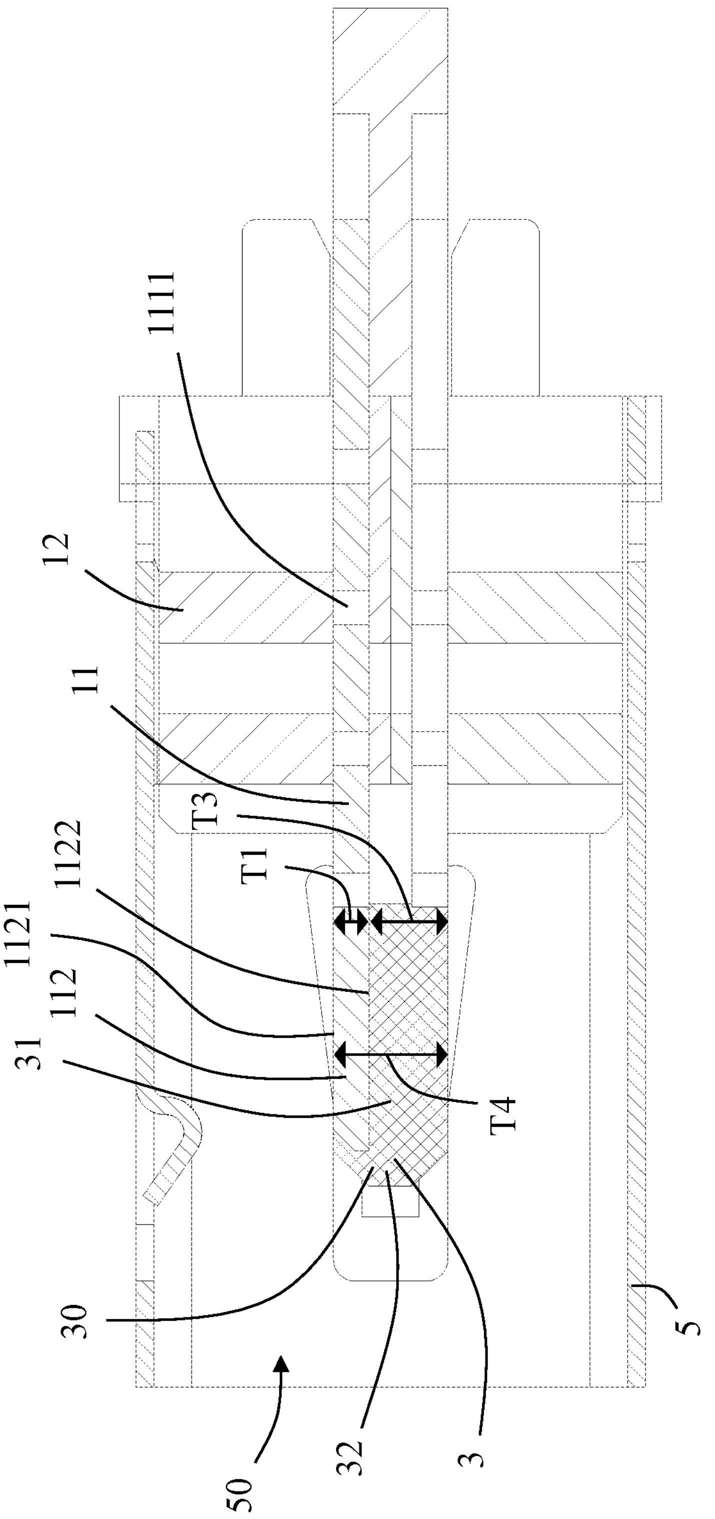
FIG. 15 is a schematic cross-sectional view in accordance with another embodiment of FIG. 14.

Referring to FIG. 15, in another embodiment of the present disclosure, the electrical connector 100 includes only one built-in circuit board, that is, the first built-in circuit board 11. At this time, the tongue plate 30 includes the first extension portion 112 and the attachment portion 31. The thickness T4 of the tongue plate 30 in the top-bottom direction includes the thickness T1 of the first extension portion 112 and the thickness T3 of the attachment portion 31. In other words, in this embodiment, the thickness T4 of the tongue plate 30 in the top-bottom direction is equal to a sum of the thickness T1 of the first extension portion 112 and the thickness T3 of the attachment portion 31.

Figure 16:
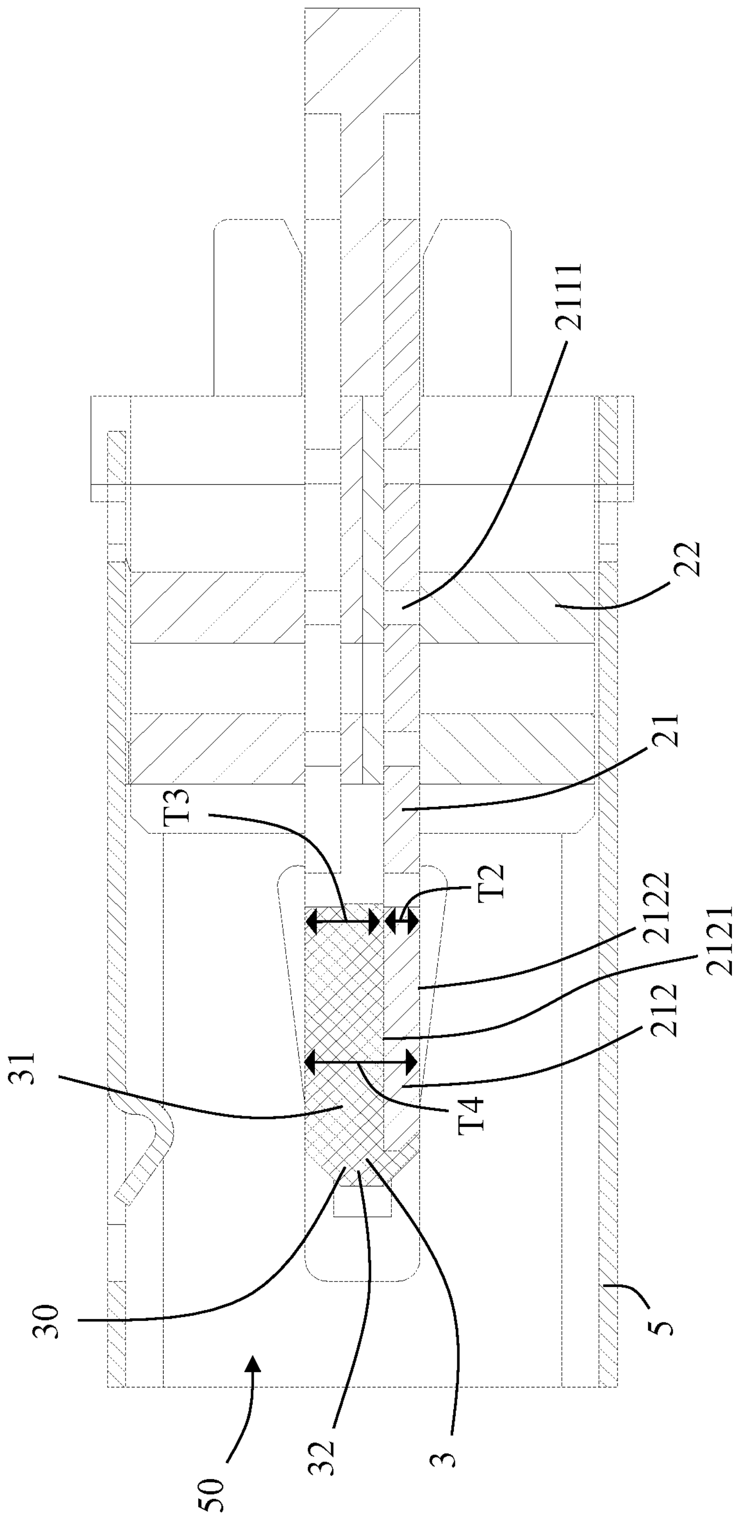
FIG. 16 is a schematic cross-sectional view in accordance with another embodiment of FIG. 15.
Figure 17:
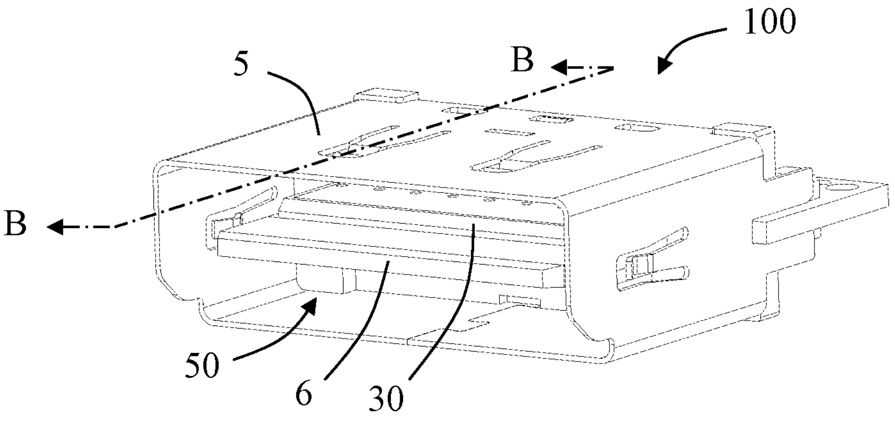
FIG. 17 is a schematic perspective view of the electrical connector in accordance with a second embodiment of the present disclosure.
Figure 18:
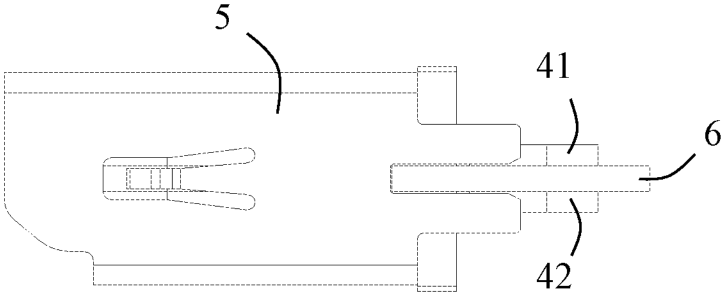
FIG. 18 is a right side view of FIG. 17.
Figure 19:
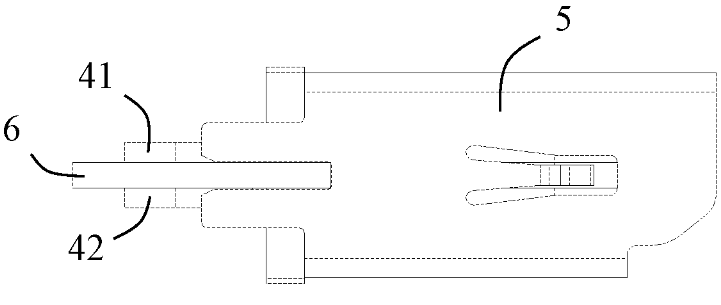
FIG. 19 is a left side view of FIG. 17.
Figure 20:
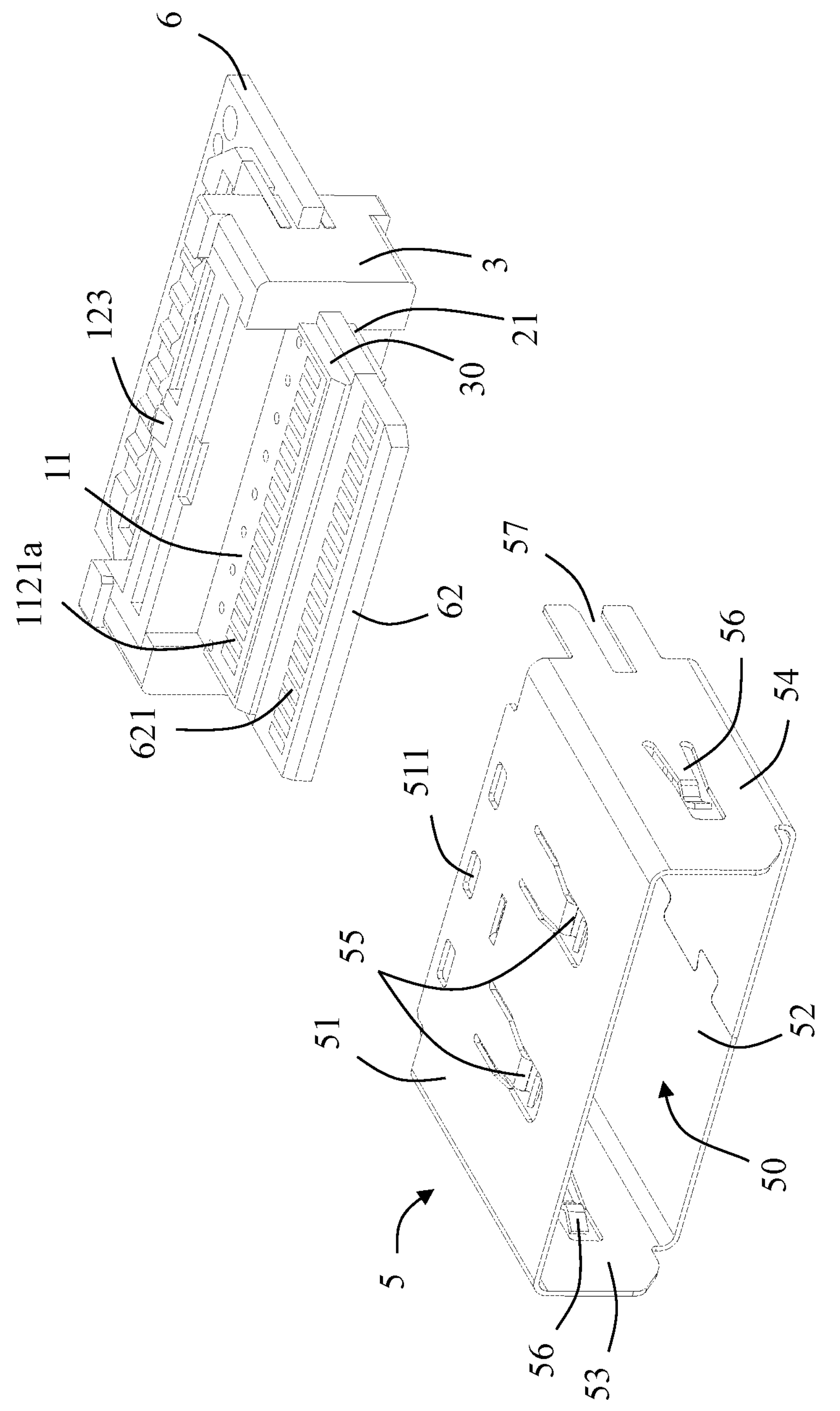
FIG. 20 is a partial perspective exploded view of FIG. 17.
Figure 21:
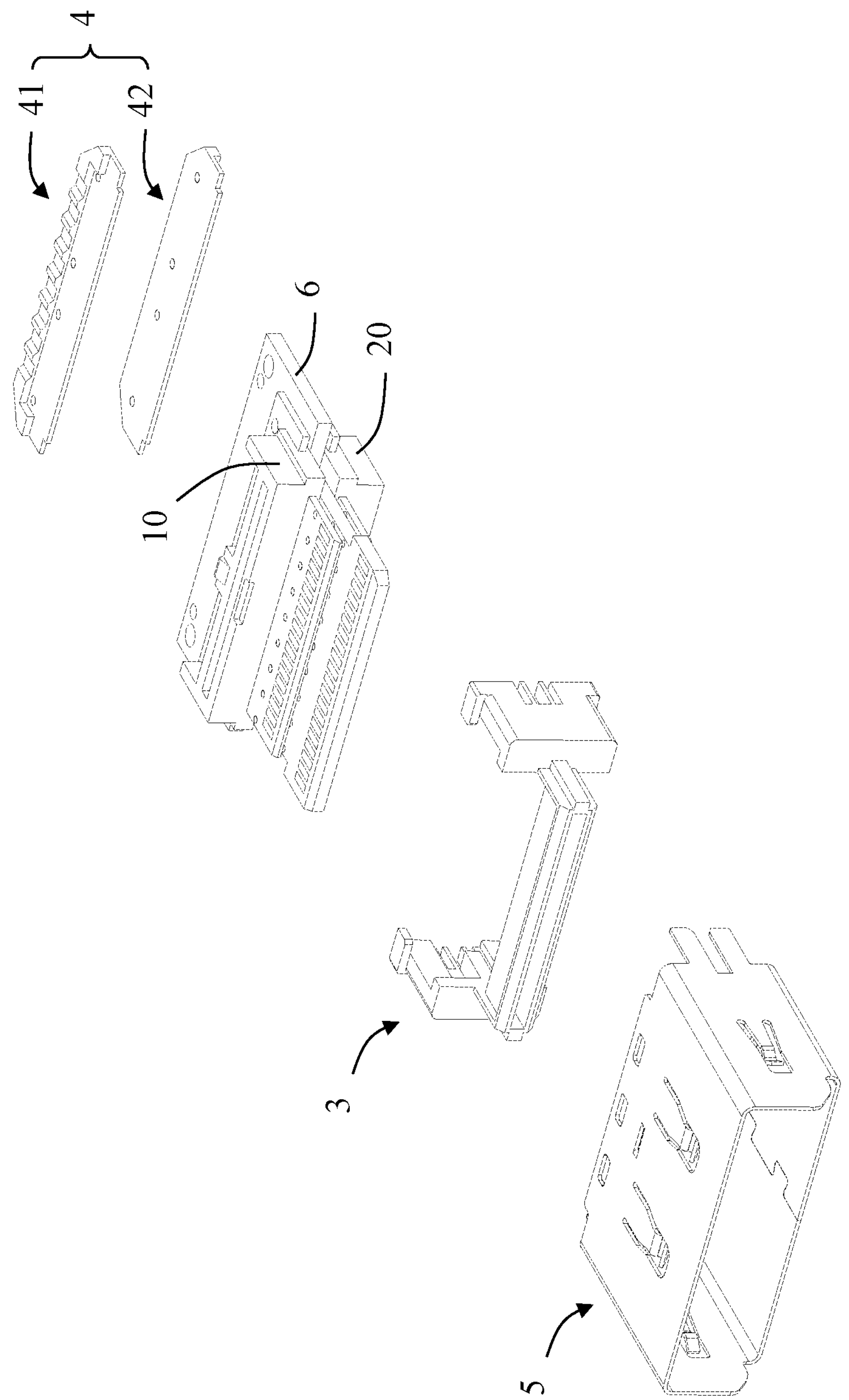
FIG. 21 is a further partial perspective exploded view of FIG. 20.
Figure 22:
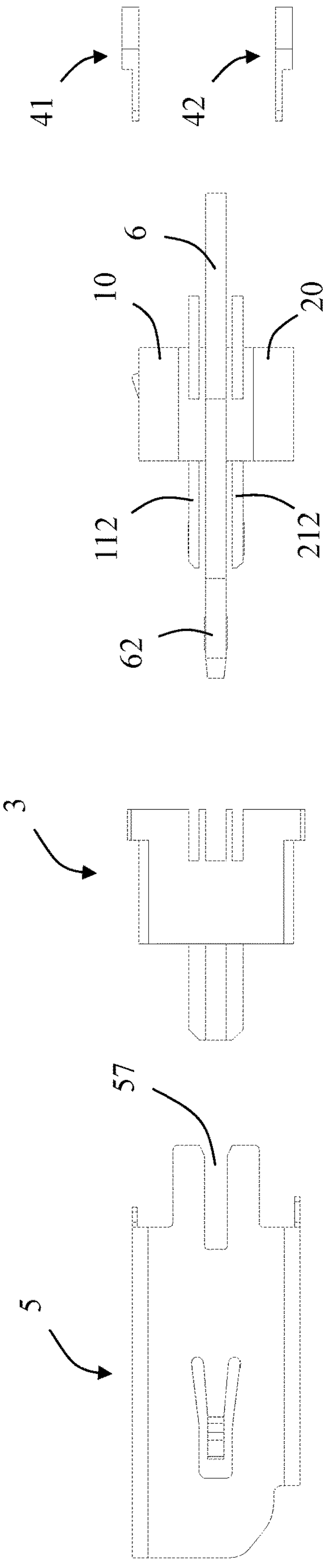
FIG. 22 is a right side view of FIG. 21.
Figure 23:
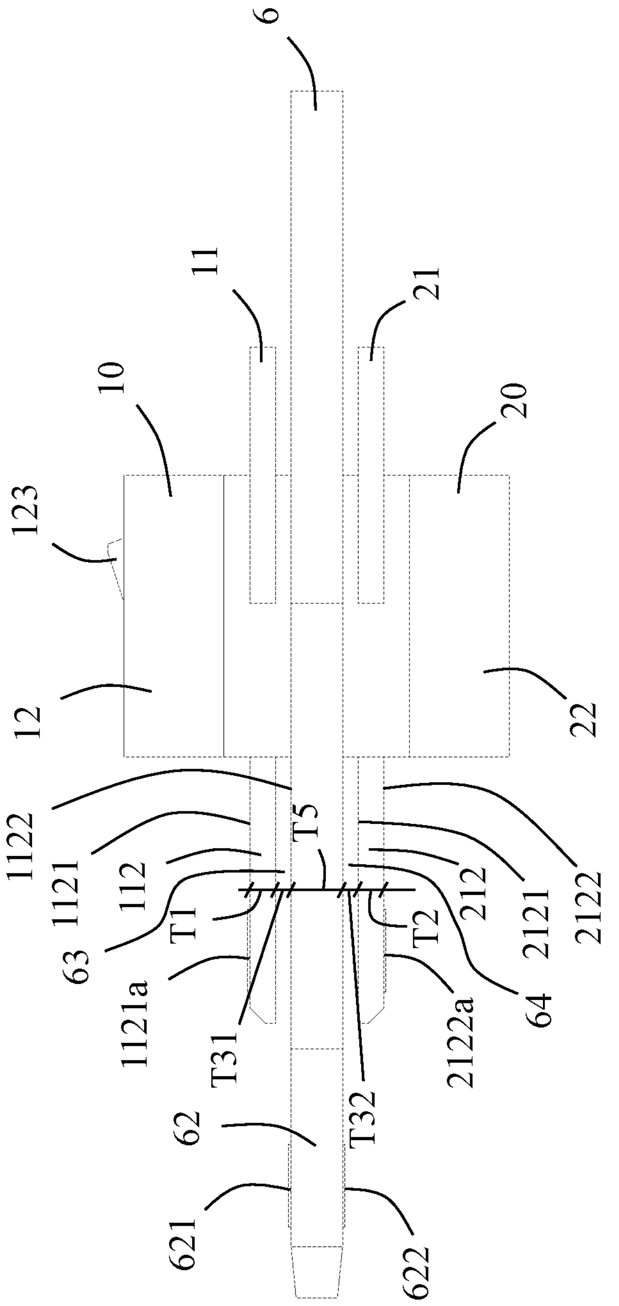
FIG. 23 is a right side view of the first circuit board assembly, the second circuit board assembly and an intermediate circuit board in FIG. 22 when they are assembled together.
Figure 24:
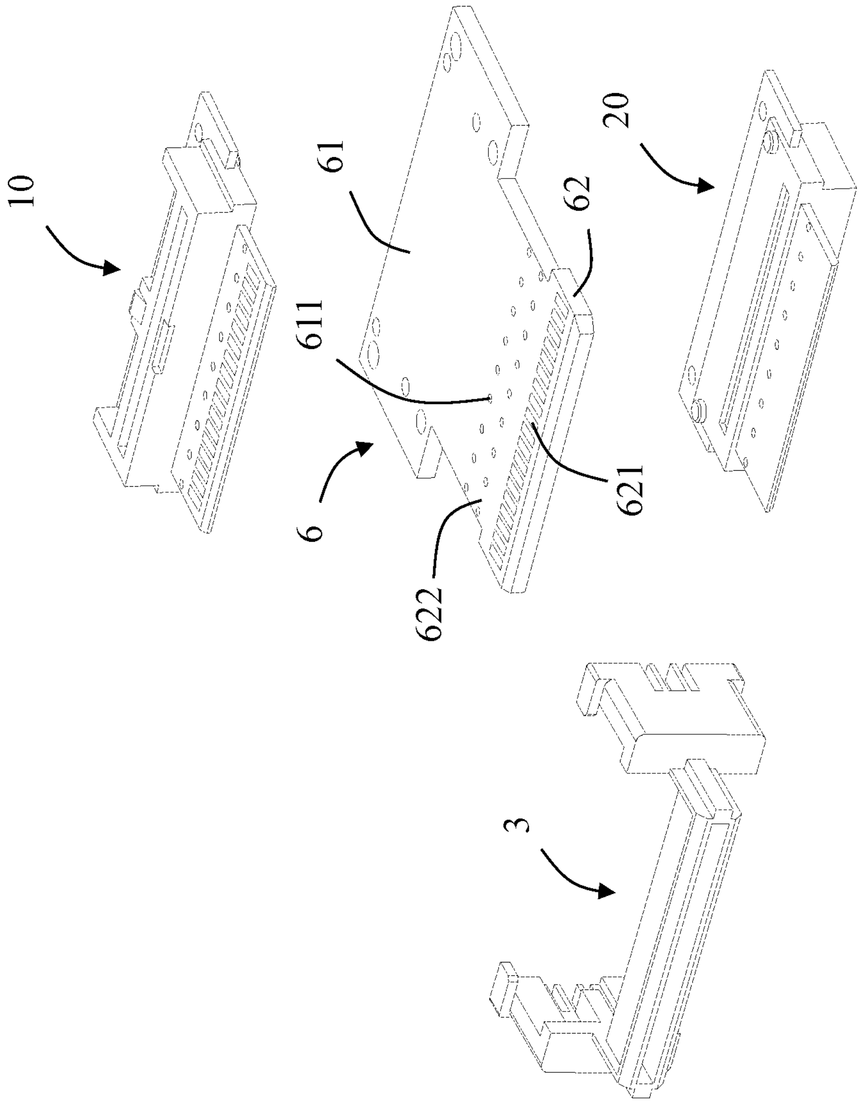
FIG. 24 is a partial perspective exploded view after removing the shielding shell in FIG. 21.
Figure 25:
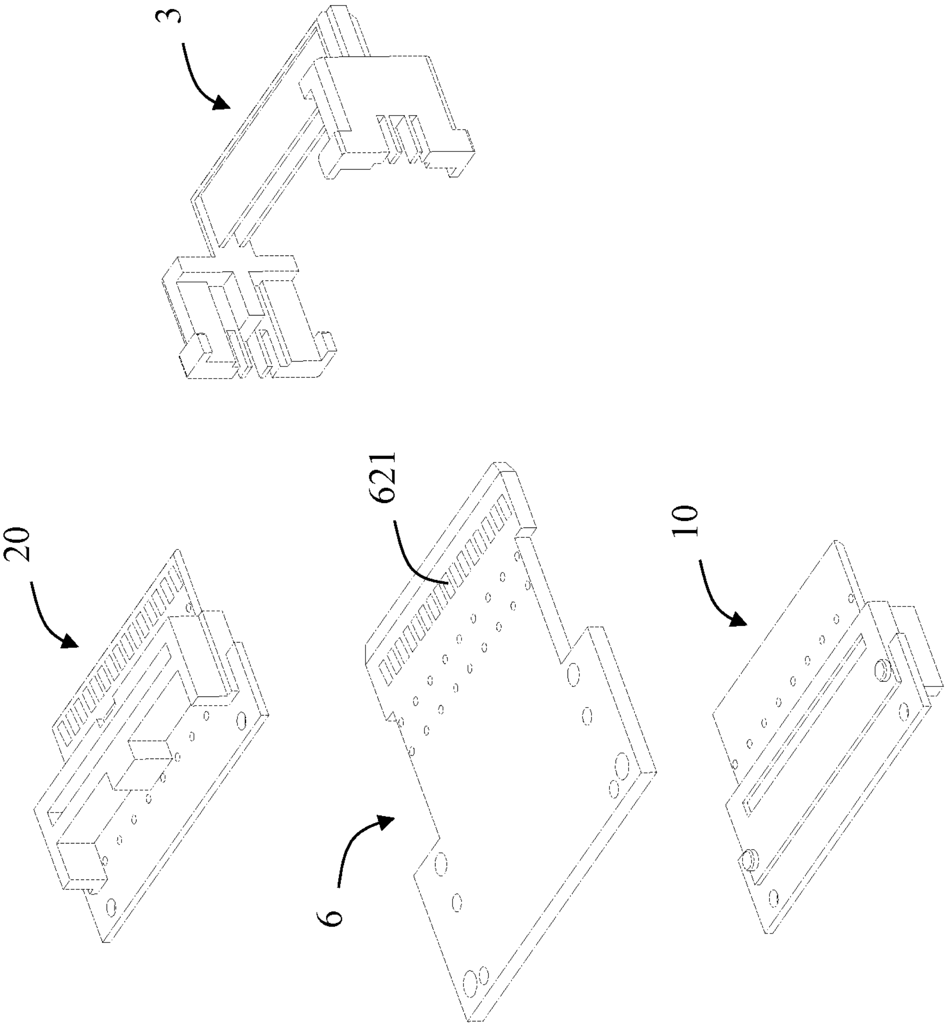
FIG. 25 is a partially exploded perspective view of FIG. 24 from another angle.
Figure 26:
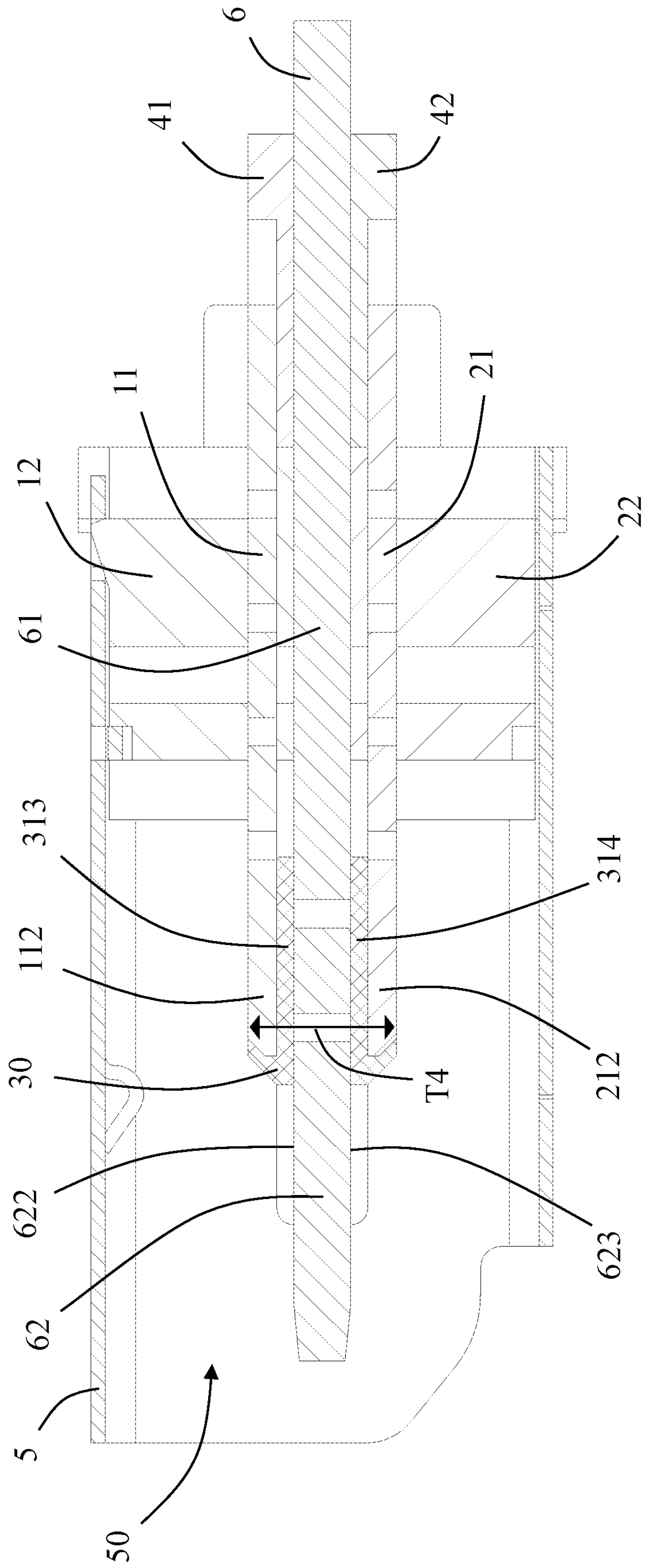
FIG. 26 is a schematic cross-sectional view taken along line B-B in FIG. 17.

Referring to FIG. 16, in another embodiment of the present disclosure, the electrical connector 100 includes only one built-in circuit board, that is, the second built-in circuit board 21. At this time, the tongue plate 30 includes the attachment portion 31 and the second extension portion

212. The thickness T4 of the tongue plate 30 in the top-bottom direction includes the thickness T3 of the attachment portion 31 and the thickness T2 of the second extension portion 212. In other words, in this embodiment, the thickness T4 of the tongue plate 30 in the top-bottom direction is equal to a sum of the thickness T3 of the attachment portion 31 and the thickness T2 of the second extension portion 212.

Referring to FIG. 14, in the embodiment shown in the present disclosure, the electrical connector 100 includes a spacing groove 120 located between the first rear end portion 113 of the first built-in circuit board 11 and the second rear end portion 213 of the second built-in circuit board 21 in the top-bottom direction. The support block 4 is at least partially accommodated in the spacing groove 120. The support block 4 includes a plurality of cable positioning grooves 40 for positioning cables (not shown).

Referring to FIGS. 1 to 3, FIG. 5 and FIG. 14, in an embodiment of the present disclosure, the support block 4 is injection-molded into the spacing groove 120. Specifically, the electrical connector 100 includes a slot 124 between the first protruding portion 1131 of the first rear end portion 113 and the second protruding portion 2131 of the second rear end portion 213 along the top-bottom direction. The insulating member 3 includes a first interlayer block 34 which is injection-molded into the slot 124. The first interlayer block 34 protrudes beyond the base portion 33 in the left-right direction. The support block 4 includes a second interlayer block 44 injection-molded into the slot 124. The first interlayer block 34 fills in a front half of the slot 124 in the front-to-rear direction, and the second interlayer block 44 fills in a rear half of the slot 124 in the front-to-rear direction. Preferably, the second interlayer block 44 is integrated with the first interlayer block 34, thereby improving the overall structural strength of the electrical connector 100.

Figure 4:
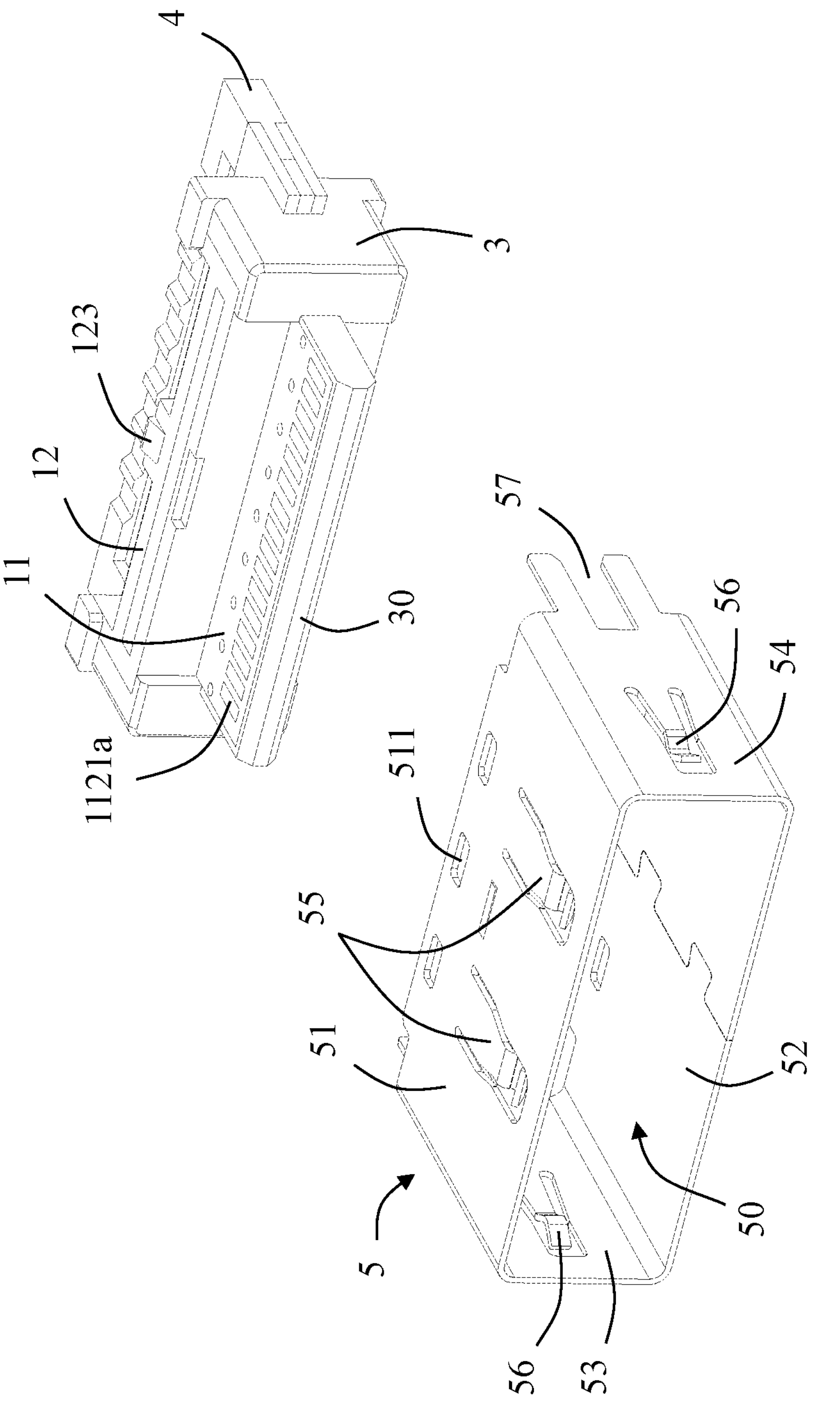
FIG. 4 is a partial perspective exploded view of FIG. 1.
Figure 5:
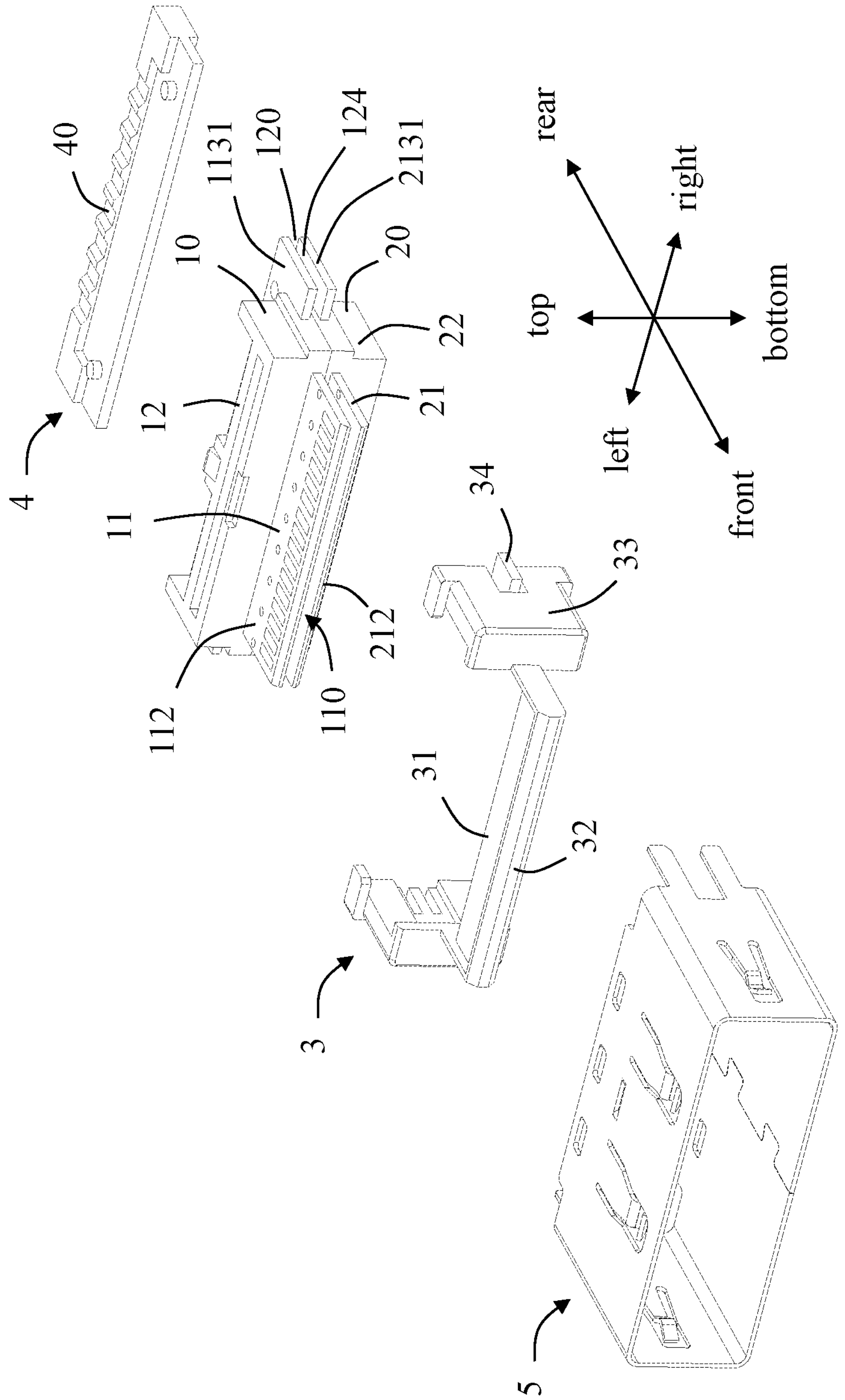
FIG. 5 is a further partial perspective exploded view of FIG. 4.
Figure 6:
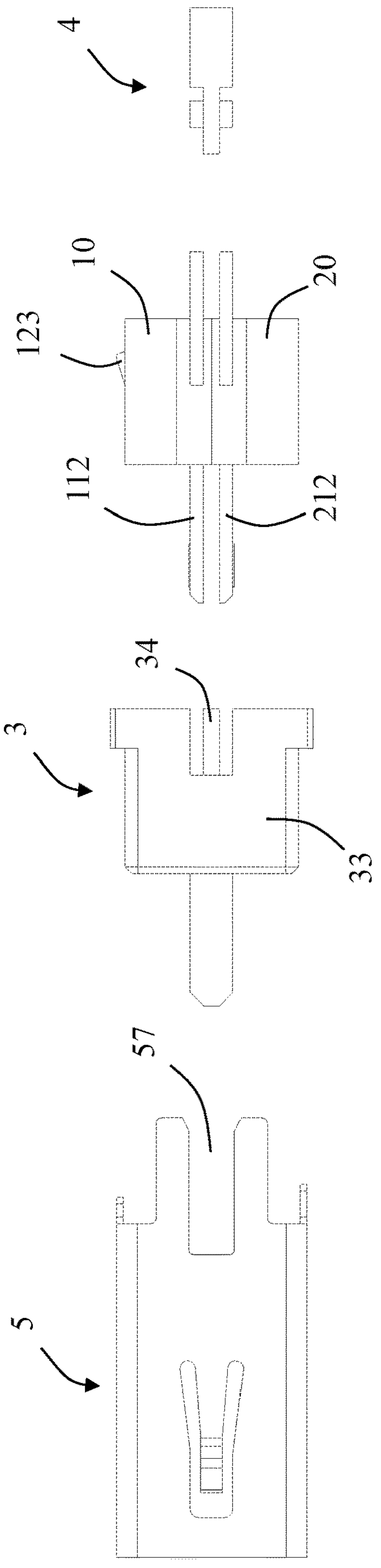
FIG. 6 is a right side view of FIG. 5.
Figure 7:
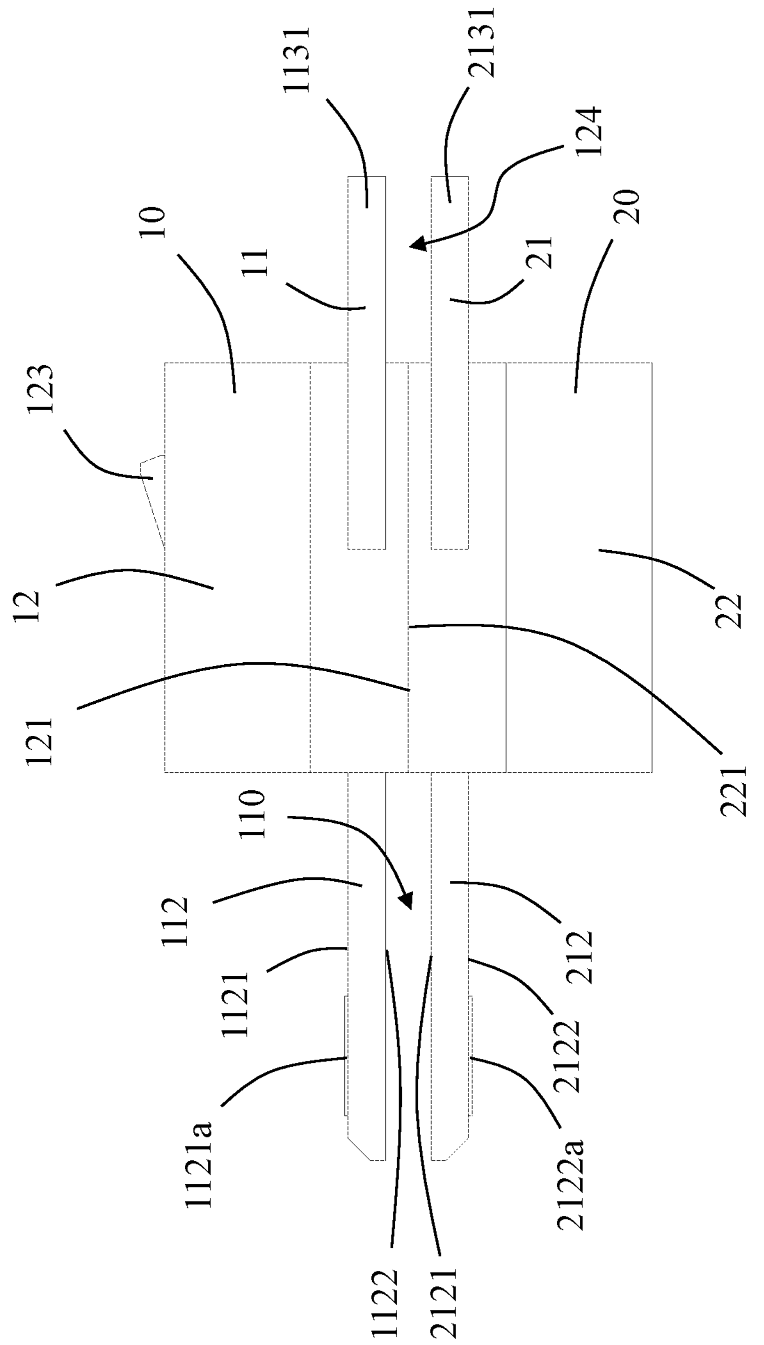
FIG. 7 is a right side view of a first circuit board assembly and a second circuit board assembly in FIG. 6 when they are assembled together.

Referring to FIG. 4, the shielding shell 5 includes a top wall 51, a bottom wall 52 opposite to the top wall 51, a first side wall 53 connecting the top wall 51 and the bottom wall 52, a second side wall 54 opposite to the first side wall 53, and a mating space 50 enclosed by the top wall 51, the bottom wall 52, the first side wall 53 and the second side wall 54. The mating space is used to accommodate the mating connector. The top wall 51 and/or the bottom wall 52 includes two first engaging elastic arms 55 which protrude inwardly into the mating space 50. The first side wall 53 and/or the second side wall 54 includes a second engaging elastic arm 56 which protrudes inwardly into the mating space 50. The first engaging elastic arms 55 and the second engaging elastic arm 56 are both used for abutting with a shell of the mating connector, so as to improve the insertion force and realize the grounding effect. In the embodiment shown in the present disclosure, the top wall 51 further includes a first locking hole 511 which is locked with the first locking protrusion 123 of the first insulating block 12. In this way, after the first circuit board assembly 10, the second circuit board assembly 20 and the insulating member 3 are formed as a whole and then assembled with the shielding shell 5, the shielding shell 5 can be snap-fitted with the first circuit board assembly 10 and the second circuit board assembly 20. After assembly, the tongue plate 30 is at least partially located in the mating space 50. The first mating conductive pads 1121*a* and the second mating conductive pads 2122*a* are both exposed in the mating space 50 to abut against elastic terminals (not shown) of the mating connector.

In the embodiment shown in the present disclosure, the first side wall 53 and the second side wall 54 are both provided with a slot 57. The slots 57 extend backwardly through the first side wall 53 and the second side wall 54. After the first circuit board assembly 10, the second circuit board assembly 20, the insulating member 3 and the support block 4 are assembled with the shielding shell 5 as a whole, the first protruding portion 1131 and the second protruding portion 2131 are tightly engaged in the slots 57 along the top-bottom direction.

Referring to FIGS. 17 to 26, a second embodiment of the present disclosure further discloses another electrical connector 100 including a first circuit board assembly 10, a second circuit board assembly 20, an insulating member 3, an intermediate circuit board 6, a support block 4 and a shielding shell 5. Only the main differences between the electrical connector 100 in the first embodiment and the electrical connector 100 in the second embodiment will be described below, and the same or similar parts between the two will not be repeated.

In the second embodiment of the present disclosure, the first circuit board assembly 10 is assembled to the intermediate circuit board 6, and the second circuit board assembly 20 is also assembled to the intermediate circuit board 6.

Specifically, in the embodiment shown in the present disclosure, the intermediate circuit board 6 includes a body portion 61 and a protrusion portion 62 protruding forwardly from the body portion 61. The body portion 61 defines a plurality of third through holes 611 extending through the body portion 61 in the top-bottom direction, so that when the insulating member 3 is injection molded, the insulating member 3 can pass through the third through holes 611. At least one surface of the protrusion portion 62 is provided with a plurality of metal conductive pads 621. In an embodiment of the present disclosure, the protrusion portion 62 includes an upper surface 622 and a lower surface 623. The upper surface 622 and the lower surface 623 are provided with the plurality of metal conductive pads 621. The upper surface 622 of the protrusion portion 62 is lower than the first surface 1121 of the first extension portion 112 in the top-bottom direction so as to form an upper step. The lower surface 623 of the protrusion portion 62 is higher than the sixth surface 2122 of the second extension portion 212 in the top-bottom direction so as to form a lower step. In other words, the first extension portion 112 protrudes upwardly beyond the protrusion portion 62 in the thickness direction of the tongue plate 30; and the second extension portion 212 protrudes downwardly beyond the protrusion portion 62 in the thickness direction of the tongue plate 30.

The protrusion portion 62 of the intermediate circuit board 6 is located between the first extension portion 112 and the second extension portion 212 in the thickness direction of the tongue plate 30. The electrical connector includes a first filling groove 63 located between the first extension portion 112 of the first built-in circuit board 11 and the protrusion portion 62 in the thickness direction of the tongue plate, and a second filling groove 64 located between the second extension portion 212 of the second built-in circuit board 21 and the protrusion portion 62.

The attachment portion 31 of the insulating member 3 includes a first attachment portion 313 which is at least partially filled into the first filling groove 63, and a second attachment portion 314 which is at least partially filled into the second filling groove 64.

The tongue plate 30 includes the first extension portion 112, the first attachment portion 313, the protrusion portion 62, the second attachment portion 314, and the second extension portion 212. The thickness T4 of the tongue plate 30 in the top-bottom direction is a sum of the thickness T1 of the first extension portion 112, the thickness T31 of the first attachment portion 313, the thickness T5 of the protrusion portion 62, the thickness T32 of the second attachment portion 314, and the thickness T2 of the second extension portion 212.

The first circuit board assembly 10 includes the first built-in circuit board 11 and a first insulating block 12 for fixing the first built-in circuit board 11. In an embodiment of the present disclosure, the first insulating block 12 is injection-molded with the first built-in circuit board 11 so as to be integrated with the first built-in circuit board 11 as a whole.

The second circuit board assembly 20 includes the second built-in circuit board 21 and a second insulating block 22 for fixing the second built-in circuit board 21. In an embodiment of the present disclosure, the second insulating block 22 is injection-molded with the second built-in circuit board 21 to be integrated with the second built-in circuit board 21 as a whole.

During assembly, the first insulating block 12 of the first circuit board assembly 10 is assembled to the body portion 61 of the intermediate circuit board 6 to control a distance between the first extension portion 112 and the protrusion portion 62 in the thickness direction of the tongue plate 30, that is, a thickness of the first filling groove 63 in the top-bottom direction. The second insulating block 22 of the second circuit board assembly 20 is assembled to the body portion 61 of the intermediate circuit board 6 to control a distance between the second extension portion 212 and the protrusion portion 62 in the thickness direction of the tongue plate 30, that is, a thickness of the second filling groove 64 in the top-bottom direction.

In the second embodiment of the present disclosure, the support block 4 includes a first support block 41 and a second support block 42. The first support block 41 is injection-molded between the body portion 61 of the intermediate circuit board 6 and the first rear end portion 113 of the first built-in circuit board 11. The second support block 42 is injection-molded between the body portion 61 of the intermediate circuit board 6 and the second rear end portion 213 of the second built-in circuit board 21.

For better understanding of the present disclosure, an upper concept of the first built-in circuit board 11 and the second built-in circuit board 21 is a built-in circuit board. That is, the built-in circuit board includes the first built-in circuit board 11 and/or the second built-in circuit board 21. An upper concept of the first extension portion 112 and the second extension portion 212 is an extension portion. That is, the extension portion includes the first extension portion 112 and/or the second extension portion 212. An upper concept of first mating conductive pads 1121*a* and the second mating conductive pads 2122*a* is a mating conductive element. That is, the mating conductive element includes the first mating conductive pads 1121*a* and/or the second mating conductive pads 2122*a*; and so on. In addition, the first surface, the second surface, the third surface, the fourth surface, the fifth surface, the sixth surface, the upper surface, the lower surface, etc., can be adaptively replaced according to different situations, as long as the understanding of the core idea of the present disclosure is not affected.

In addition, the present disclosure also discloses a method for manufacturing the above electrical connector 100, which includes the following steps:

S1, providing the built-in circuit board, the thickness of the extension portion of the built-in circuit board being smaller than the target thickness;

S2, providing the insulating member 3, the insulating member 3 and the built-in circuit board being integrally formed, the thickness of the attachment portion 31 of the insulating member 3 being smaller than the target thickness, at least the extension portion of the built-in circuit board and the attachment portion 31 of the insulating member 3 form the tongue plate 30 of the electrical connector 100, the thickness T4 of the tongue plate 30 including at least the thickness of the extension portion and the thickness of the attachment portion, and the thickness of the tongue plate reaching the target thickness; and S3, providing the shielding shell 5, the shielding shell 5 and the insulating member 3 are assembled and fixed.

Specifically, in an embodiment, in the step S1, the built-in circuit board includes the first built-in circuit board 11 and the second built-in circuit board 21. At this time, the step S1 includes the following sub-steps:

S11, providing the first built-in circuit board 11, and injection molding the first insulating block 12 on the first built-in circuit board 11 to form the first circuit board assembly S12, providing the second built-in circuit board 21, and injection molding the second insulating block 22 on the second built-in circuit board 21 to form the second circuit board assembly 20; and S13, assembling the first circuit board assembly 10 and the second circuit board assembly 20 together.

Specifically, in another embodiment, in the step S1, the built-in circuit board includes the first built-in circuit board 11 and the second built-in circuit board 21. At this time, the step S1 includes the following sub-steps:

S11, providing the first built-in circuit board 11, and injection molding the first insulating block 12 on the first built-in circuit board 11 to form the first circuit board assembly 10;

S12, providing the second built-in circuit board 21, and injection molding the second insulating block 22 on the second built-in circuit board 21 to form the second circuit board assembly 20;

S13, providing the intermediate circuit board 6; and

S14, assembling the first circuit board assembly 10 and the second circuit board assembly 20 to the intermediate circuit board 6.

Referring to FIGS. 8 and 9, in addition, the present disclosure also discloses another method of making the above electrical connector 100, which includes the following steps:

S1, providing the built-in circuit board, a thickness of the extension portion of the built-in circuit board being smaller than the target thickness;

S2, providing the thickness adjustment member, injection molding the thickness adjustment member on the built-in circuit board, so that the set thickness T0 is made to reach the target thickness by controlling the position of the reference surface relative to the extension portion.

Compared with the prior art, regardless of whether the built-in circuit board includes the first built-in circuit board 11 and/or the second built-in circuit board 21, or whether the intermediate circuit board 6 is provided, the present disclosure controls the position of the reference surface relative to the extension portion through the thickness adjustment member, so that the set thickness T0 reaches the target thickness. For example, the present disclosure utilizes the attachment portion 31 of the insulating member 3 (including the first attachment portion 313 and/or the second attachment portion 314, the same below) to increase the thickness in the top-bottom direction, thereby adjusting the thickness T4 of the tongue plate 30. In this way, even if the thickness of the built-in circuit board does not meet the thickness requirement of the tongue plate 30, the target thickness of the tongue plate 30 can be achieved by adjusting the thickness of the attachment portion 31. The design of the present disclosure can minimize the diversification of the thickness requirements of the built-in circuit board due to the different thickness requirements of the tongue plate 30. In short, even with the built-in circuit board has only one thickness, various tongue plates 30 with different thicknesses can be obtained by changing the thickness of the attachment portion 31. The present disclosure reduces the requirements for built-in circuit boards, reduces costs, and improves manufacturing flexibility. Preferably, the first insulating block 12 in the present disclosure is injection-molded with the first built-in circuit board 11, the second insulating block 22 in the present disclosure is injection-molded with the second built-in circuit board 21, and the insulating member 3 is injection-molded with the first circuit board assembly 10 and the second circuit board assembly 20. With this arrangement, the size of the injection molded part can be controlled more precisely through the injection molding process, which is beneficial to obtain the tongue plate 30 with a more accurate size.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

a built-in circuit board comprising an extension portion, the extension portion comprising a first mating surface and a second mating surface opposite to the first mating surface, the built-in circuit board comprising a plurality of mating conductive elements disposed on the first mating surface and/or the second mating surface, the extension portion having a thickness defined by a distance between the first mating surface and the second mating surface; and a thickness adjustment member fixed with the built-in circuit board, the thickness adjustment member comprising a reference surface, the first mating surface, the second mating surface and the reference surface being located in different planes, a distance between the reference surface and the first mating surface being defined as a set thickness of the extension portion;

wherein the electrical connector is configured to make the set thickness reach a target thickness by controlling a position of the reference surface relative to the extension portion, and the target thickness is greater than the thickness of the extension portion.

2. The electrical connector according to claim 1, wherein the thickness adjustment member comprises an insulating block injection-molded with the built-in circuit board, and the reference surface is an upper injection molding surface or a lower injection molding surface provided on the insulating block.

3. The electrical connector according to claim 2, wherein the built-in circuit board comprises a first built-in circuit board, the extension portion comprises a first extension portion provided on the first built-in circuit board, the first extension portion comprises a first surface and a second surface opposite the first surface, the plurality of mating conductive elements comprise a plurality of first mating conductive pads provided on the first surface, the first mating surface is the first surface, and the second mating surface is the second surface;

wherein the insulating block comprises a first insulating block injection-molded with the first built-in circuit board, the first insulating block comprises a first abutting surface, and the first abutting surface is the lower injection molding surface; and wherein the electrical connector comprises a first circuit board assembly comprising the first built-in circuit board and the first insulating block.

4. The electrical connector according to claim 1, wherein the thickness adjustment member comprises an insulating member injection-molded with the built-in circuit board, the insulating member comprises an attachment portion, the attachment portion comprises a third surface abutting against the second mating surface of the built-in circuit board and a fourth surface opposite to the third surface, the attachment portion has a thickness defined by a distance between the third surface and the fourth surface; and wherein the electrical connector comprises a tongue plate, the tongue plate comprises at least the extension portion and the attachment portion, and a thickness of the tongue plate comprises at least the thickness of the extension portion and the thickness of the attachment portion.

5. The electrical connector according to claim 2, wherein the built-in circuit board comprises a second built-in circuit board, the extension portion comprises a second extension portion provided on the second built-in circuit board, the second extension portion comprises a fifth surface and a sixth surface opposite the fifth surface, the plurality of mating conductive elements comprise a plurality of second mating conductive pads provided on the sixth surface, the first mating surface is the sixth surface, and the second mating surface is the fifth surface;

wherein the insulating block comprises a second insulating block injection-molded with the second built-in circuit board, the second insulating block comprises a second abutting surface, and the second abutting surface is the upper injection molding surface; and wherein the electrical connector comprises a second circuit board assembly, and the second circuit board assembly comprises the second built-in circuit board and the second insulating block.

6. The electrical connector according to claim 4, wherein the built-in circuit board comprises a first built-in circuit board, the extension portion comprises a first extension portion provided on the first built-in circuit board, the first extension portion comprises a first surface and a second surface opposite the first surface, the plurality of mating conductive elements comprise a plurality of first mating conductive pads provided on the first surface, the first mating surface is the first surface, the second mating surface is the second surface, and the reference surface is the fourth surface.

7. The electrical connector according to claim 4, wherein the built-in circuit board comprises a second built-in circuit board, the extension portion comprises a second extension portion provided on the second built-in circuit board, the second extension portion comprises a fifth surface and a sixth surface opposite the fifth surface, the plurality of mating conductive elements comprise a plurality of second mating conductive pads provided on the sixth surface, the first mating surface is the sixth surface, the second mating surface is the fifth surface, and the reference surface is the third surface.

8. An electrical connector, comprising:

a built-in circuit board comprising an extension portion, the extension portion comprising a first surface and a second surface opposite the first surface, the built-in circuit board comprising a plurality of mating conductive elements provided on the first surface, the extension portion having a thickness defined by a distance between the first surface and the second surface;

an insulating member fixed to the built-in circuit board, the insulating member comprising an attachment portion, the attachment portion comprising a third surface abutting against the second surface of the built-in circuit board and a fourth surface opposite to the third surface, the attachment portion having a thickness defined by a distance between the third surface and the fourth surface; and a shielding shell defining a mating space, the extension portion and the attachment portion being at least partially located in the mating space;

wherein the electrical connector comprises a tongue plate, the tongue plate comprises at least the extension portion and the attachment portion, and a thickness of the tongue plate comprises at least the thickness of the extension portion and the thickness of the attachment portion.

9. The electrical connector according to claim 8, wherein the insulating member comprises a head fixed to an end of the extension portion, the head is provided with an inclined guide surface and an outer surface connected with the inclined guide surface, and the outer surface is flush with the first surface of the extension portion.

10. The electrical connector according to claim 8, wherein the built-in circuit board comprises a first built-in circuit board and a second built-in circuit board, the extension portion comprises a first extension portion provided on the first built-in circuit board and a second extension portion provided on the second built-in circuit board, the first extension portion and the second extension portion are arranged at intervals along a thickness direction of the tongue plate, the electrical connector comprises a filling groove located between the first extension portion and the second extension portion along the thickness direction of the tongue plate;

wherein the first extension portion comprises the first surface and the second surface, the first extension portion has a thickness defined by the distance between the first surface and the second surface;

wherein the second extension portion comprises a fifth surface abutting against the fourth surface of the attachment portion and a sixth surface opposite the fifth surface, the plurality of mating conductive elements comprise a plurality of first mating conductive pads provided on the first surface and a plurality of second mating conductive pads provided on the sixth surface, the second extension portion has a thickness defined by a distance between the fifth surface and the sixth surface; and wherein the tongue plate comprises the first extension portion, the attachment portion and the second extension portion, the attachment portion fills in at least the filling groove, a thickness of the tongue plate is a sum of the thickness of the first extension portion, a thickness of the attachment portion and the thickness of the second extension portion.

11. The electrical connector according to claim 10, wherein the insulating member comprises a head fixed to an end of the tongue plate, the head is provided with a first inclined guide surface, a first outer surface connected with the first inclined guide surface, a second inclined guide surface, and a second outer surface connected to the second inclined guide surface, the first outer surface is flush with the first surface of the first extension portion, the second outer surface is flush with the sixth surface of the second extension portion.

12. The electrical connector according to claim 10, wherein the insulating member is an injection-molded part which is at least injection-molded in the filling groove.

13. The electrical connector according to claim 10, further comprising a first circuit board assembly and a second circuit board assembly, the first circuit board assembly and the second circuit board assembly being assembled together, the first circuit board assembly comprising the first built-in circuit board and a first insulating block for fixing the first built-in circuit board, the second circuit board assembly comprising the second built-in circuit board and a second insulating block for fixing the second built-in circuit board;

wherein the first insulating block comprises a first abutting surface, the second insulating block comprises a second abutting surface, the first abutting surface is in contact with the second abutting surface, so as to control a distance between the first extension portion and the second extension portion in the thickness direction of the tongue plate.

14. The electrical connector according to claim 13, wherein the first insulating block is injection-molded with the first built-in circuit board, the first built-in circuit board comprises a first main body portion connected with the first extension portion and a first rear end portion extending backwardly from the first main body portion;

wherein the second insulating block is injection-molded with the second built-in circuit board, the second built-in circuit board comprises a second main body portion connected with the second extension portion and a second rear end portion extending backwardly from the second main body portion;

wherein the first rear end portion and the second rear end portion are arranged at intervals in the thickness direction of the tongue plate, the electrical connector comprises a spacing groove located between the first rear end portion and the second rear end portion in the thickness direction of the tongue plate; and wherein the electrical connector further comprises a support block at least partially filled in the spacing groove, and the support block comprises a plurality of cable positioning grooves.

15. The electrical connector according to claim 14, wherein the insulating member comprises a base portion injection-molded with the first insulating block and the second insulating block, the first built-in circuit board comprises a first protruding portion protruding beyond the base portion, the second built-in circuit board comprises a second protruding portion protruding beyond the base portion, the insulating member comprises a first interlayer block which is injection-molded between the first protruding portion and the second protruding portion, the first interlayer block protrudes beyond the base portion, the support block further comprises a second interlayer block filled between the first protruding portion and the second protruding portion, and the second interlayer block protrudes beyond the base portion.

16. The electrical connector according to claim 14, wherein the first built-in circuit board defines a plurality of first through holes extending through the first built-in circuit board along the thickness direction of the tongue plate, the first insulating block passes through the plurality of first through holes;

the first built-in circuit board defines a first holding hole extending through the first built-in circuit board along the thickness direction of the tongue plate, the first insulating block comprises a positioning post formed through the first holding hole;

the second built-in circuit board defines a plurality of second through holes extending through the second built-in circuit board along the thickness direction of the tongue plate, the second insulating block passes through the plurality of second through holes; and the second insulating block comprises a positioning hole to receive the positioning post.

17. The electrical connector according to claim 8, further comprising an intermediate circuit board, the intermediate circuit board comprising a body portion and a protrusion portion protruding from the body portion, at least one surface of the protrusion portion being provided with metal conductive pads;

wherein the built-in circuit board comprises a first built-in circuit board and a second built-in circuit board, the extension portion comprises a first extension portion provided on the first built-in circuit board and a second extension portion provided on the second built-in circuit board, the protrusion portion of the intermediate circuit board is located between the first extension portion and the second extension portion in the thickness direction of the tongue plate, the electrical connector comprises a first filling groove located between the first extension portion and the protrusion portion in the thickness direction of the tongue plate, and a second filling groove located between the second extension portion and the protrusion portion;

wherein the attachment portion comprises a first attachment portion at least partially filled in the first filling groove and a second attachment portion at least partially filled in the second filling groove; and wherein the tongue plate comprises the first extension portion, the first attachment portion, the protrusion portion, the second attachment portion and the second extension portion; a thickness of the tongue plate is a sum of a thickness of the first extension portion, a thickness of the first attachment portion, a thickness of the protrusion portion, a thickness of the second attachment portion and a thicknesses of the second extension portion.

18. The electrical connector according to claim 17, wherein the first extension portion protrudes upwardly beyond the protrusion portion in the thickness direction of the tongue plate; and the second extension portion protrudes downwardly beyond the protrusion portion in the thickness direction of the tongue plate.

19. The electrical connector according to claim 17, further comprising a first circuit board assembly and a second circuit board assembly, the first circuit board assembly comprising the first built-in circuit board and a first insulating block for fixing the first built-in circuit board, the second circuit board assembly comprising the second built-in circuit board and a second insulating block for fixing the second built-in circuit board;

wherein the first insulating block is assembled to the intermediate circuit board in order to control a distance between the first extension portion and the protrusion portion in the thickness direction of the tongue plate;

wherein the second insulating block is assembled to the intermediate circuit board in order to control a distance between the second extension portion and the protrusion portion in the thickness direction of the tongue plate.

20. A method of manufacturing an electrical connector, the electrical connector comprising:

a built-in circuit board comprising an extension portion, the extension portion comprising a first surface and a second surface opposite the first surface, the built-in circuit board comprising a plurality of mating conductive elements provided on the first surface, the extension portion having a thickness defined by a distance between the first surface and the second surface;

an insulating member fixed to the built-in circuit board, the insulating member comprising an attachment portion, the attachment portion comprising a third surface abutting against the second surface of the built-in circuit board and a fourth surface opposite to the third surface, the attachment portion having a thickness defined by a distance between the third surface and the fourth surface; and a shielding shell defining a mating space, the extension portion and the attachment portion at least partially extending into the mating space;

wherein the electrical connector comprises a tongue plate, the tongue plate comprises at least the extension portion and the attachment portion, and a thickness of the tongue plate comprises at least the thickness of the extension portion and the thickness of the attachment portion;

the method comprising following steps:

S1, providing the built-in circuit board, the thickness of the extension portion of the built-in circuit board being smaller than the target thickness;

S2, providing a thickness adjustment member and injection-molding the thickness adjustment member with the built-in circuit board, the thickness of the attachment portion of the insulating member being smaller than the target thickness, at least the extension portion of the built-in circuit board and the attachment portion of the insulating member forming the tongue plate of the electrical connector, the thickness of the tongue plate comprising at least the thickness of the extension portion and the thickness of the attachment portion, and the thickness of the tongue plate reaching the target thickness; and S3, providing the shielding shell, and assembling the shielding shell with the insulating member.

* * * * *